US011663471B2

(12) United States Patent
Hoang et al.

(10) Patent No.: US 11,663,471 B2
(45) Date of Patent: May 30, 2023

(54) COMPUTE-IN-MEMORY DEEP NEURAL NETWORK INFERENCE ENGINE USING LOW-RANK APPROXIMATION TECHNIQUE

(71) Applicant: SanDisk Technologies LLC, Addison, TX (US)

(72) Inventors: Tung Thanh Hoang, San Jose, CA (US); Won Ho Choi, Santa Clara, CA (US); Martin Lueker-Boden, Fremont, CA (US)

(73) Assignee: SanDisk Technologies LLC, Addison, TX (US)

( * ) Notice: Subject to any disclaimer, the term of this patent is extended or adjusted under 35 U.S.C. 154(b) by 406 days.

(21) Appl. No.: 16/912,846

(22) Filed: Jun. 26, 2020

(65) Prior Publication Data
US 2021/0406672 A1 Dec. 30, 2021

(51) Int. Cl.
*G06N 3/08* (2023.01)
*G06N 3/04* (2023.01)
*G06N 3/063* (2023.01)
*G06F 12/02* (2006.01)
*G06F 13/16* (2006.01)

(52) U.S. Cl.
CPC ........... *G06N 3/08* (2013.01); *G06F 12/0207* (2013.01); *G06F 12/0238* (2013.01); *G06F 13/1668* (2013.01); *G06N 3/04* (2013.01); *G06N 3/063* (2013.01)

(58) Field of Classification Search
CPC ............................. G06F 13/1668; G06N 3/04
See application file for complete search history.

(56) References Cited

U.S. PATENT DOCUMENTS 7,324,366 B2  1/2008 Bednorz et al.
7,505,347 B2  3/2009 Rinerson et al.
(Continued)

FOREIGN PATENT DOCUMENTS

CN  109785826 A  * 5/2019  ............. G06F 17/16
CN  110597555 A  12/2019
CN  110598858 A  12/2019

OTHER PUBLICATIONS

Resch, Salonik, et al., "PIMBALL: Binary Neural Networks in Spintronic Memory," ACM Trans. Arch. Code Optim., vol. 37, No. 4, Article 111, Aug. 2018, 25 pages.
(Continued)

*Primary Examiner* — Michael A Keller
(74) *Attorney, Agent, or Firm* — Vierra Magen Marcus LLP

(57) ABSTRACT

Non-volatile memory structures for performing compute in memory inferencing for neural networks are presented. To improve performance, both in terms of speed and energy consumption, weight matrices are replaced with their singular value decomposition (SVD) and use of a low rank approximations (LRAs). The decomposition matrices can be stored in a single array, with the resultant LRA matrices requiring fewer weight values to be stored. The reduced sizes of the LRA matrices allow for inferencing to be performed more quickly and with less power. In a high performance and energy efficiency mode, a reduced rank for the SVD matrices stored on a memory die is determined and used to increase performance and reduce power needed for an inferencing operation.

20 Claims, 28 Drawing Sheets

(56) References Cited

U.S. PATENT DOCUMENTS

| | | | |
|---|---|---|---|
| 8,416,624 | B2 | 4/2013 | Lei et al. |
| 8,634,247 | B1 | 1/2014 | Sprouse et al. |
| 8,634,248 | B1 | 1/2014 | Sprouse et al. |
| 8,773,909 | B2 | 7/2014 | Li et al. |
| 8,780,632 | B2 | 7/2014 | Sprouse et al. |
| 8,780,633 | B2 | 7/2014 | Sprouse et al. |
| 8,780,634 | B2 | 7/2014 | Sprouse et al. |
| 8,780,635 | B2 | 7/2014 | Li et al. |
| 8,792,279 | B2 | 7/2014 | Li et al. |
| 8,811,085 | B2 | 8/2014 | Sprouse et al. |
| 8,817,541 | B2 | 8/2014 | Li et al. |
| 9,098,403 | B2 | 8/2015 | Sprouse et al. |
| 9,104,551 | B2 | 8/2015 | Sprouse et al. |
| 9,116,796 | B2 | 8/2015 | Sprouse et al. |
| 9,384,126 | B1 | 7/2016 | Sprouse et al. |
| 9,730,735 | B2 | 8/2017 | Mishra et al. |
| 9,887,240 | B2 | 2/2018 | Shimabukuro et al. |
| 10,127,150 | B2 | 11/2018 | Sprouse et al. |
| 10,459,724 | B2 | 10/2019 | Yu et al. |
| 10,535,391 | B2 | 1/2020 | Osada et al. |
| 2014/0133228 | A1 | 5/2014 | Sprouse et al. |
| 2014/0133233 | A1 | 5/2014 | Li et al. |
| 2014/0133237 | A1 | 5/2014 | Sprouse et al. |
| 2014/0136756 | A1 | 5/2014 | Sprouse et al. |
| 2014/0136757 | A1 | 5/2014 | Sprouse et al. |
| 2014/0136758 | A1 | 5/2014 | Sprouse et al. |
| 2014/0136760 | A1 | 5/2014 | Sprouse et al. |
| 2014/0136762 | A1 | 5/2014 | Li et al. |
| 2014/0136763 | A1 | 5/2014 | Li et al. |
| 2014/0136764 | A1 | 5/2014 | Li et al. |
| 2014/0156576 | A1 | 6/2014 | Nugent |
| 2014/0136761 | A1 | 7/2014 | Li et al. |
| 2014/0294272 | A1 | 10/2014 | Madhabushi et al. |
| 2015/0324691 | A1 | 11/2015 | Dropps et al. |
| 2016/0026912 | A1 | 1/2016 | Falcon et al. |
| 2017/0098156 | A1 | 4/2017 | Nino et al. |
| 2017/0228637 | A1 | 8/2017 | Santoro et al. |
| 2018/0039886 | A1 | 2/2018 | Umuroglu et al. |
| 2018/0075339 | A1 | 3/2018 | Ma et al. |
| 2018/0144240 | A1 | 5/2018 | Garbin et al. |
| 2019/0251425 | A1 | 8/2019 | Jaffari et al. |
| 2021/0011732 | A1* | 1/2021 | Botimer ............... G06F 12/0207 |
| 2021/0034567 | A1* | 2/2021 | Bringivijayaraghavan ................ G06F 3/0659 |
| 2021/0295137 | A1* | 9/2021 | Thakker ............... G06F 12/023 |

OTHER PUBLICATIONS

Zamboni, Prof. Maurizio, et al., "In-Memory Binary Neural Networks," Master's Thesis, Master's Degree in Electronic Engineering, Politechnico Di Torino, Apr. 10, 2019, 327 pages.

Natsui, Masanori, et al., "Design of an energy-efficient XNOR gate based on MTJ-based nonvolatile logic-in-memory architecture for binary neural network hardware," Japanese Journal of Applied Physics 58, Feb. 2019, 8 pages.

Rastegari, Mohammad et al., "XNOR-Net: ImageNet Classification Using Binary Convolutional Neural Networks," proceedings ECCV 2016, Aug. 2016, 55 pages.

Wan, Diwen, et al., "TBN: Convolutional Neural Network with Ternary Inputs and Binary Weights," ECCV 2018, Oct. 2018, 18 pages.

Chen, Yu-Hsin, et al., "Eyeriss: An Energy-Efficient Reconfigurable Accelerator for Deep Convolutional Neural Networks," IEEE Journal of Solid-State Circuits, Feb. 2016, 12 pages.

Sun, Xiaoyu, et al., "Fully Parallel RRAM Synaptic Array for Implementing Binary Neural Network with (+1,-1) Weights and (+1, 0) Neurons," 23rd Asia and South Pacific Design Automation Conference, Jan. 2018, 6 pages. Gonugondla, Sujan K., et al., "Energy-Efficient Deep In-memory Architecture for NAND Flash Memories," IEEE International Symposium on Circuits and Systems (ISCAS), May 2018, 5 pages.

Gonugondla, Sujan K., et al., "Energy-Efficient Deep In-memory Architecture for NAND Flash Memories," IEEE International Symposium on Circuits and Systems (ISCAS), May 2018, 5 pages.

Nakahara, Hiroki, et al., "A Memory-Based Realization of a Binarized Deep Convolutional Neural Network," International Conference on Field-Programmable Technology (FPT), Dec. 2016, 4 pages.

Takeuchi, Ken, "Data-Aware NAND Flash Memory for Intelligent Computing with Deep Neural Network," IEEE International Electron Devices Meeting (IEDM), Dec. 2017, 4 pages.

Mochida, Reiji, et al., "A 4M Synapses integrated Analog ReRAM based 66.5 TOPS/W Neural-Network Processor with Cell Current Controlled Writing and Flexible Network Architecture," Symposium on VLSI Technology Digest of Technical Papers, Jun. 2018, 2 pages.

Chiu, Pi-Feng, et al., "A Differential 2R Crosspoint RRAM Array With Zero Standby Current," IEEE Transactions on Circuits and Systems-II: Express Briefs, vol. 62, No. 5, May 2015, 5 pages.

Chen, Wei-Hao, et al., "A 65nm 1Mb Nonvolatile Computing-in-Memory ReRAM Macro with Sub-16ns Mulitply-and-Accumulate for Binary DNN AI Edge Processors," IEEE International Solid-State Circuits Conference, Feb. 2018, 3 pages.

Liu, Rui, et al., "Parallelizing SRAM Arrays with Customized Bit-Cell for Binary Neural Networks," DAC '18, Jun. 2018, 6 pages.

Courbariaux, Matthieu, et al., "Binarized Neural Networks: Training Neural Networks with Weights and Activations Constrained to +1 or -1," arXiv.org, Mar. 2016, 11 pages.

Simon, Noah, et al., "A Sparse-Group Lasso," Journal of Computational and Graphical Statistics, vol. 22, No. 2, pp. 231-245, downloaded by Moskow State Univ. Bibliote on Jan. 28, 2014.

CS231n Convolutional Neural Networks for Visual Recognition, [cs231.github.io/neural-networks-2/#reg], downloaded on Oct. 15, 2019, pp. 1-15.

Krizhevsky, Alex, et al., "ImageNet Classification with Deep Convolutional Neural Networks," [http://code.google.com/p/cuda-convnet/], downloaded on Oct. 15, 2019, 9 pages.

Shafiee, Ali, et al., "ISAAC: A Convolutional Neural Network Accelerator with In-Situ Analog Arithmetic in Crossbars," ACM/IEEE 43rd Annual International Symposium on Computer Architecture (ISCA), Oct. 5, 2016, 13 pages.

Han, Song, et al., "Learning both Weights and Connections for Efficient Neural Networks," Conference paper, NIPS, Oct. 2015, 9 pages.

Jia, Yangqing, "Learning Semantic Image Representations at a Large Scale," Electrical Engineering and CS, University of Berkeley, Technical Report No. UCB/EECS-2014-93, May 16, 2014, 104 pages.

Wen, Wei, et al., "Learning Structured Sparsity in Deep Neural Networks," 30th Conference on Neural Information Processing Systems (NIPS 2016), Nov. 2016, 9 pages.

Wang, Peiqi, et al., "SNrram: An Efficient Sparse Neural Network Computation Architecture Based on Resistive Random-Access Memory," DAC '18, Jun. 24-29, 2018, 6 pages.

Zheng, Shixuan, et al., "An Efficient Kernel Transformation Architecture for Binary-and Ternary-Weight Neural Network Inference," DAC' 18, Jun. 24-29, 2018, 6 pages.

Chung, Junyoung, et al., "Empirical Evaluation of Gated Recurrent Neural Networks on Sequence Modeling," [arXiv.org > cs > arXiv:1412.3555], Dec. 11, 2014, 9 pages.

Han, Song, et al., "EIE: Efficient Inference Engine on Compressed Deep Neural Network," ACM/IEEE 43rd Annual International Symposium on Computer Architecture, May 2016, 12 pages.

Han, Song, et al., "ESE: Efficient Speech Recognition Engine with Sparse LSTM on FPGA," [arXiv.org > cs > arXiv:1612.00694], Feb. 20, 2017, 10 pages.

Gokmen, Tayfun, et al., "Training LSTM Networks with Resistive Cross-Point Devices," IBM Research AI, May 2018, 17 pages.

Long, Yun, et al., "ReRAM-Based Processing-in-Memory Architecture for Recurrent Neural Network Acceleration," IEEE Transactions on Very Large Scale Integration (VLSI) Systems, vol. 26, No. 12, Dec. 2018, 14 pages.

(56) References Cited

OTHER PUBLICATIONS

Bengio, Yoshua, et al., "Estimating or Propagating Gradients Through Stochastic Neurons for Conditional Computation," [arXiv.org > cs > arXiv:1308.3432], Aug. 15, 2013, 12 pages.

Ma, Wen, et al., "Non-Volatile Memory Array Based Quantization- and Noise-Resilient LSTM Neural Networks," IEEE International Conference on Rebooting Computing (ICRC), Nov. 2019, 9 pages.

Cho, Kyunghyun, et al., "Learning Phrase Representations using RNN Encoder-Decoder for Statistical Machine Translation," [arXiv.org > cs > arXiv:1406.1078], Sep. 3, 2014, 15 pages.

Hochreiter, Sepp, et al., "Long Short-Term Memory," Neural Computation, vol. 9, Issue 8, Nov. 1997, 32 pages.

Dutta, Aritra, et al., "Weighted Low-Rank Approximation Of Matrices and Background Modeling," [arXiv.org > cs > arXiv:1804.06252v1], Apr. 15, 2018, 13 pages.

Jaderberg, Max, et al., "Speeding up Convolutional Neural Networks with Low Rank Expansions," [arXiv.org > cs > arXiv:1405.3866v1], May 15, 2014, 12 pages.

Jouppin, Norman P., et al., "In-Datacenter Performance Analysis of a Tensor Processing Unit," ISCA '17: Proceedings of the 44th Annual International Symposium on Computer Architecture, Jun. 2017, 17 pages.

\* cited by examiner

| Arch | Complexity (#MACs) | Normalized complexity |
|---|---|---|
| Conventional | C*M*N | 1 |
| LRA-based | C*R*M + C*R + C*R*N | $\frac{R*(M+N+1)}{M*N}$ |

| CIM-DNN architecture | #MACs (#memory access) |
|---|---|
| Convention | C*M*N |
| LRA-based with $R^{OPT}$ (OPT mode) | $C*R^{OPT}(M+N+1)$ |
| LRA-based with $R^{REQ} < R^{OPT}$ (HPEE modes) | $C*R^{REQ}(M+N+1)$ |

| CIM-DNN architecture | #MACs (#memory access) |
|---|---|
| Convention | $C*M*N$ |
| LRA-based with $R^{OPT}$ (OPT mode) | $C*R^{OPT}(M+N)$ |
| LRA-based with $R^{REQ} < R^{OPT}$ (HPEE modes) | $C*R^{REQ}(M+N)$ |

US 11,663,471 B2

COMPUTE-IN-MEMORY DEEP NEURAL NETWORK INFERENCE ENGINE USING LOW-RANK APPROXIMATION TECHNIQUE

BACKGROUND

Artificial neural networks are finding increasing usage in artificial intelligence and machine learning applications. In an artificial neural network, a set of inputs is propagated through one or more intermediate, or hidden, layers to generate an output. The layers connecting the input to the output are connected by sets of weights that are generated in a training or learning phase by determining a set of a mathematical manipulations to turn the input into the output, moving through the layers calculating the probability of each output. Once the weights are established, they can be used in the inference phase to determine the output from a se of inputs, Although such neural networks can provide highly accurate results, they are extremely computationally intensive, and the data transfers involved in reading the weights connecting the different layers out of memory and transferring these weights into the processing units of a processing unit can be quite intensive.

BRIEF DESCRIPTION OF THE DRAWING

Like-numbered elements refer to common components in the different figures.

DETAILED DESCRIPTION

When a neural network performs an inference or training operation, large numbers of computations each involving large amounts of data are performed, particularly in the case of Deep Neural Networks, or DNNs, that involve large numbers of layers through which the inputs are propagated. To avoid the movement of large amounts of data in and out of the memory device, the weights of the layers for a neural network are stored in the non-volatile memory arrays of the memory device and the computations for each of the layers are performed on the device. To further improve performance, both in terms of increased speed and reduced power consumption, the weight matrices of a neural network can undergo a singular value decomposition, where a weight matrix is replaced with a set of three matrices: a left-singular vector, a descending diagonal matrix, and a right singular matrix, all of which can be stored in a single memory array. Although this replaces one matrix, and one multiply-accumulate operation, with three, it still requires fewer memory access operations. In alternate embodiments, the descending diagonal matrix can be combined with one of the singular matrices to improve performance. A low rank approximation is applied to reduce the rank (i.e., size) of the descending diagonal matrix, further improving the speed and reducing the power consumption of an inferencing operation for the neural network.

Once the decomposition matrices for a network's weights are determined using a low rank approximation and stored in the arrays of a non-volatile memory device, performance and power consumption can be further improved through use of a high performance and energy efficiency mode. A supplemental training can be performed using the weights as written into the memory arrays in order to reduce the rank of the decomposition matrices as used in inferencing.

Figure 1:
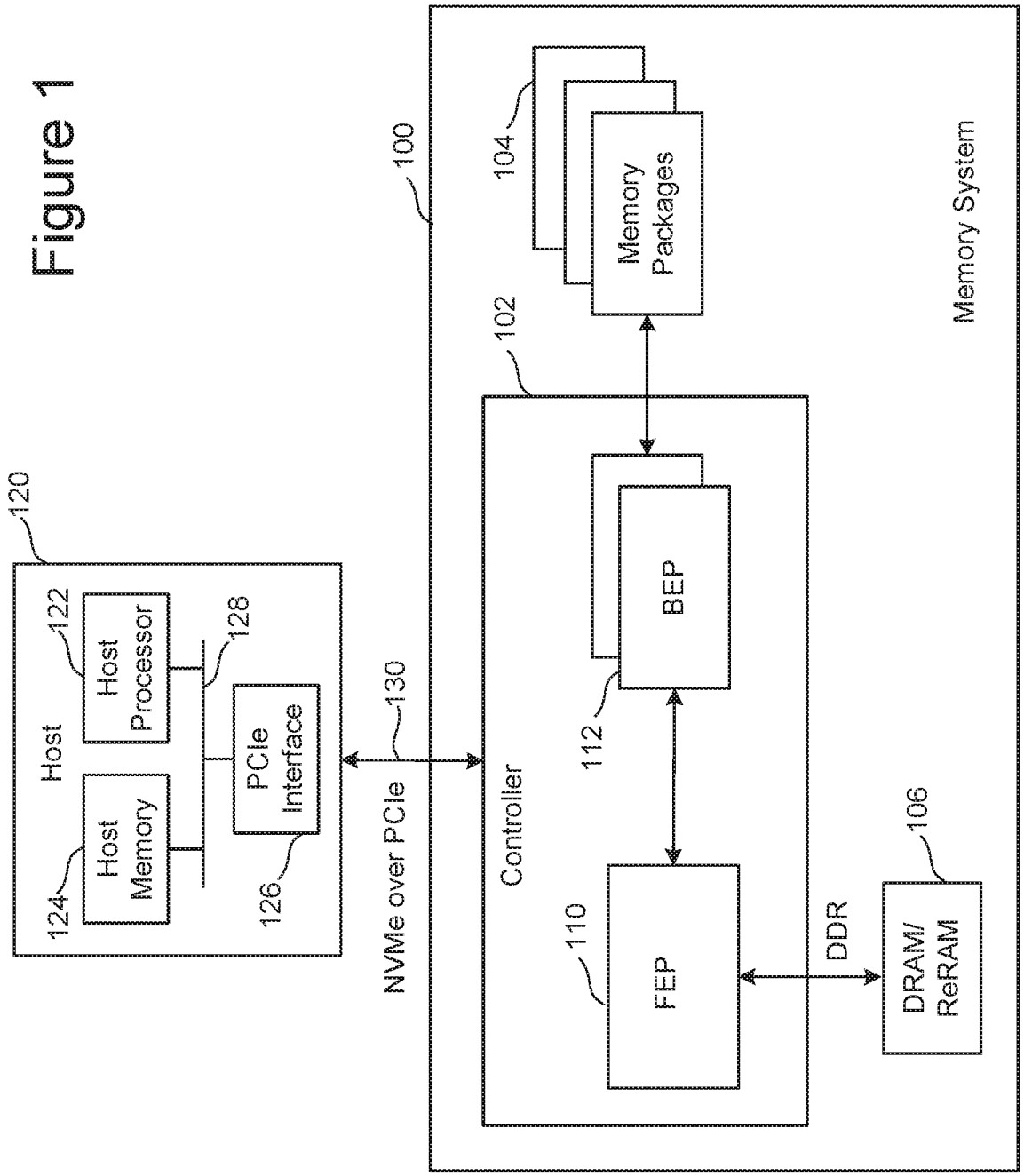
FIG. 1 is a block diagram of one embodiment of a memory system connected to a host.

FIG. 1 is a block diagram of one embodiment of a memory system 100 connected to a host 120. Memory system 100 can implement the technology proposed herein, where the neural network inputs or other data are received from the host 120. Depending on the embodiment, the inputs can be received from the host 120 and then provided to the memory packages 104 for inferencing on the weights previously programmed into the memory arrays of the memory packages 104. Many different types of memory systems can be used with the technology proposed herein. Example memory systems include solid state drives ("SSDs"), memory cards and embedded memory devices; however, other types of memory systems can also be used.

Memory system 100 of FIG. 1 comprises a controller 102, non-volatile memory 104 for storing data, and local memory (e.g., DRAM/ReRAM) 106. Controller 102 comprises a Front End Processor (FEP) circuit 110 and one or more Back End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory, such as storage class memory (SCM) based on resistive random access memory (such as ReRAM, MRAM, FeRAM or RRAM) or a phase change memory (PCM).

Controller 102 communicates with host 120 via an interface 130 that implements NVM Express (NVMe) over PCI Express (PCIe). For working with memory system 100, host 120 includes a host processor 122, host memory 124, and a PCIe interface 126 connected along bus 128. Host memory 124 is the host's physical memory, and can be DRAM, SRAM, non-volatile memory or another type of storage. Host 120 is external to and separate from memory system 100. In one embodiment, memory system 100 is embedded in host 120.

Figure 2:
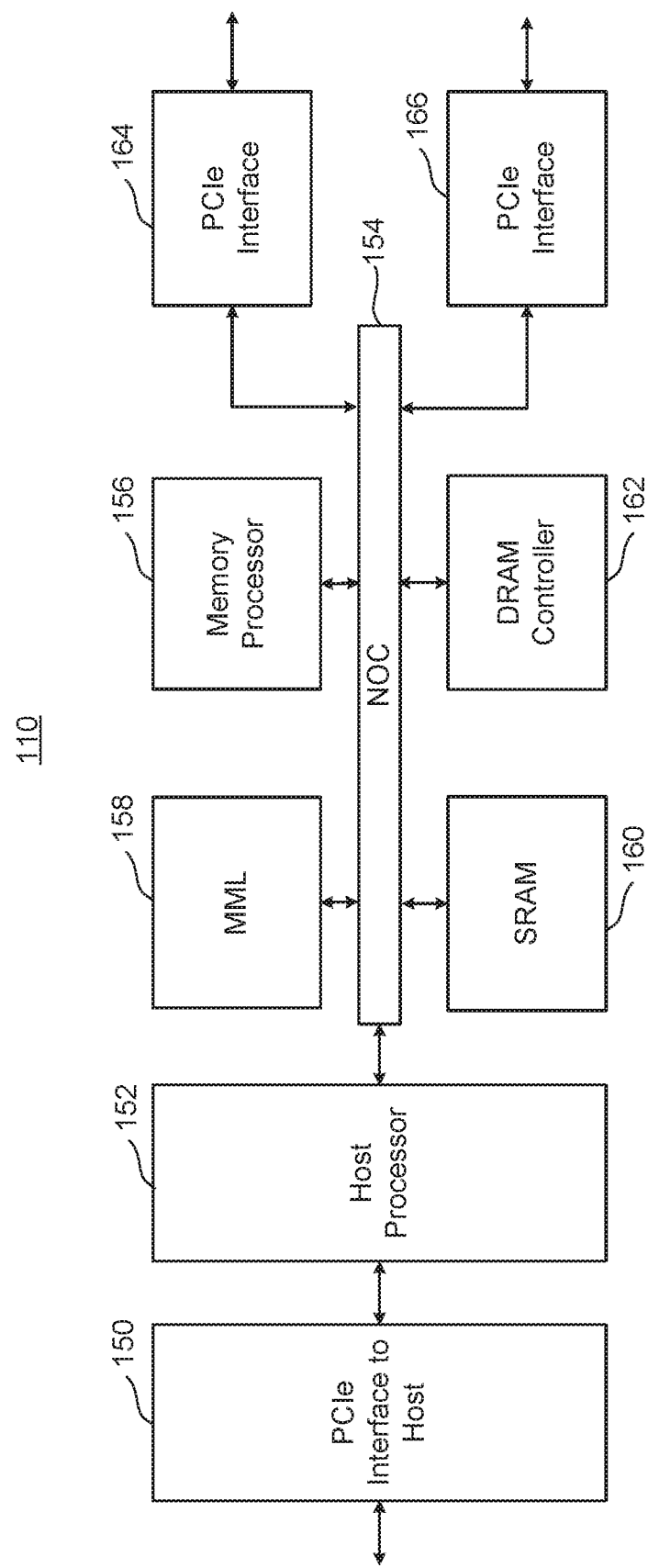
FIG. 2 is a block diagram of one embodiment of a Front End Processor Circuit. In some embodiments, the Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 326 of FIG. 5 below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

Figure 3:
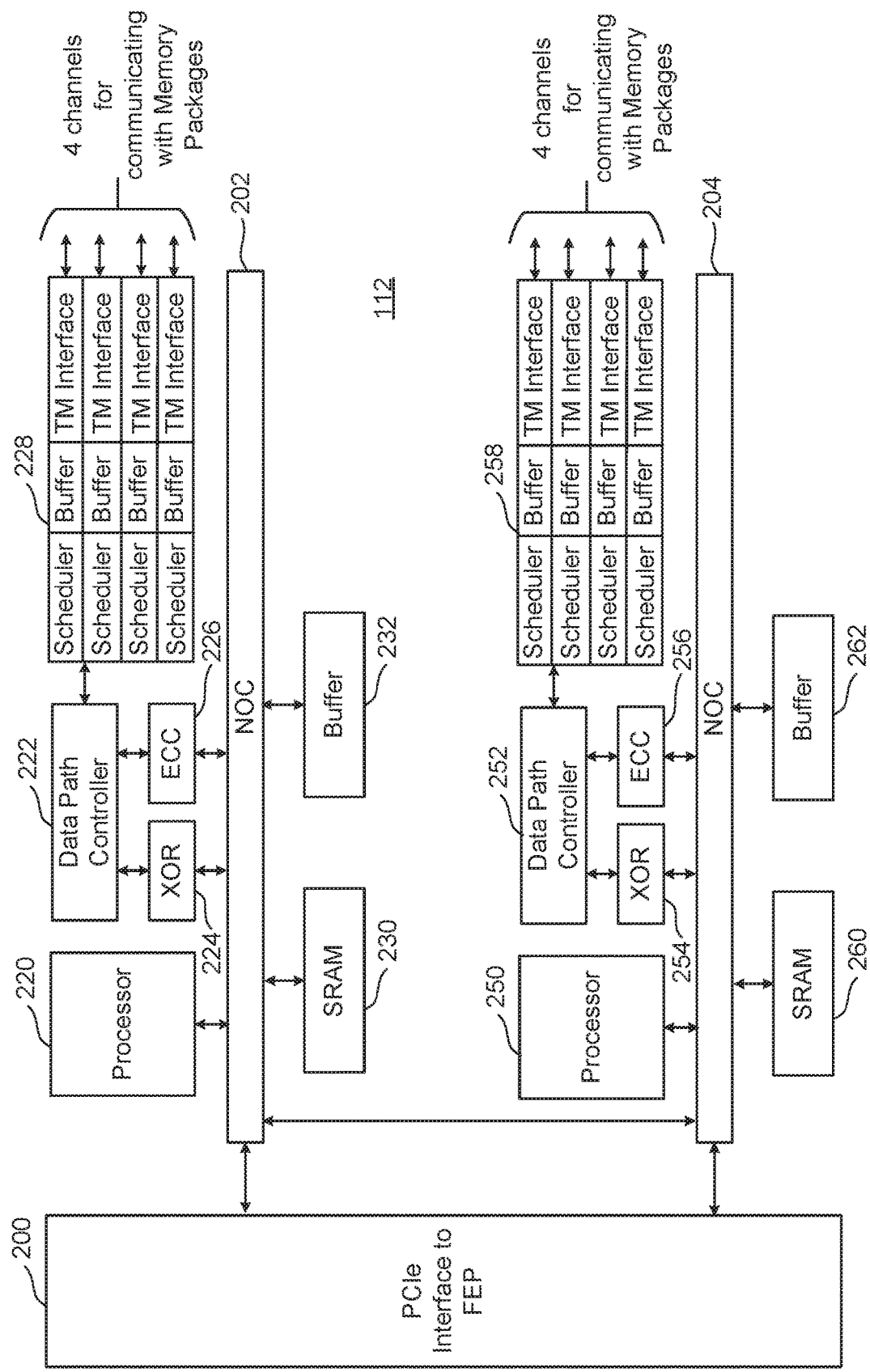
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
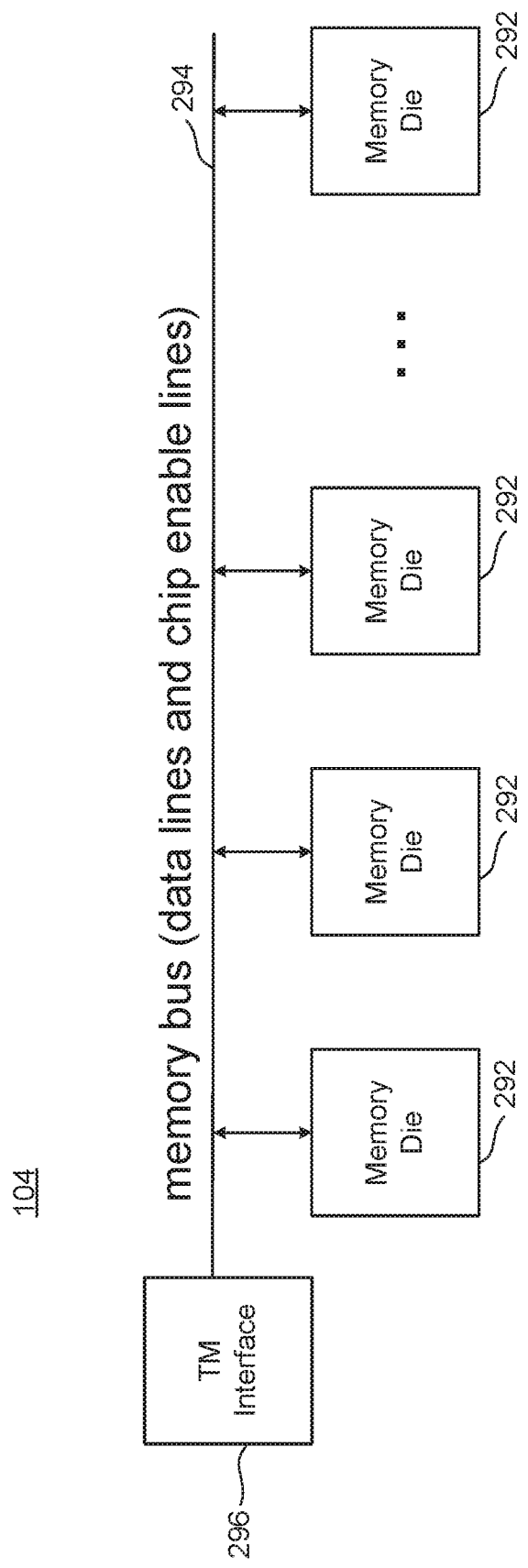
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
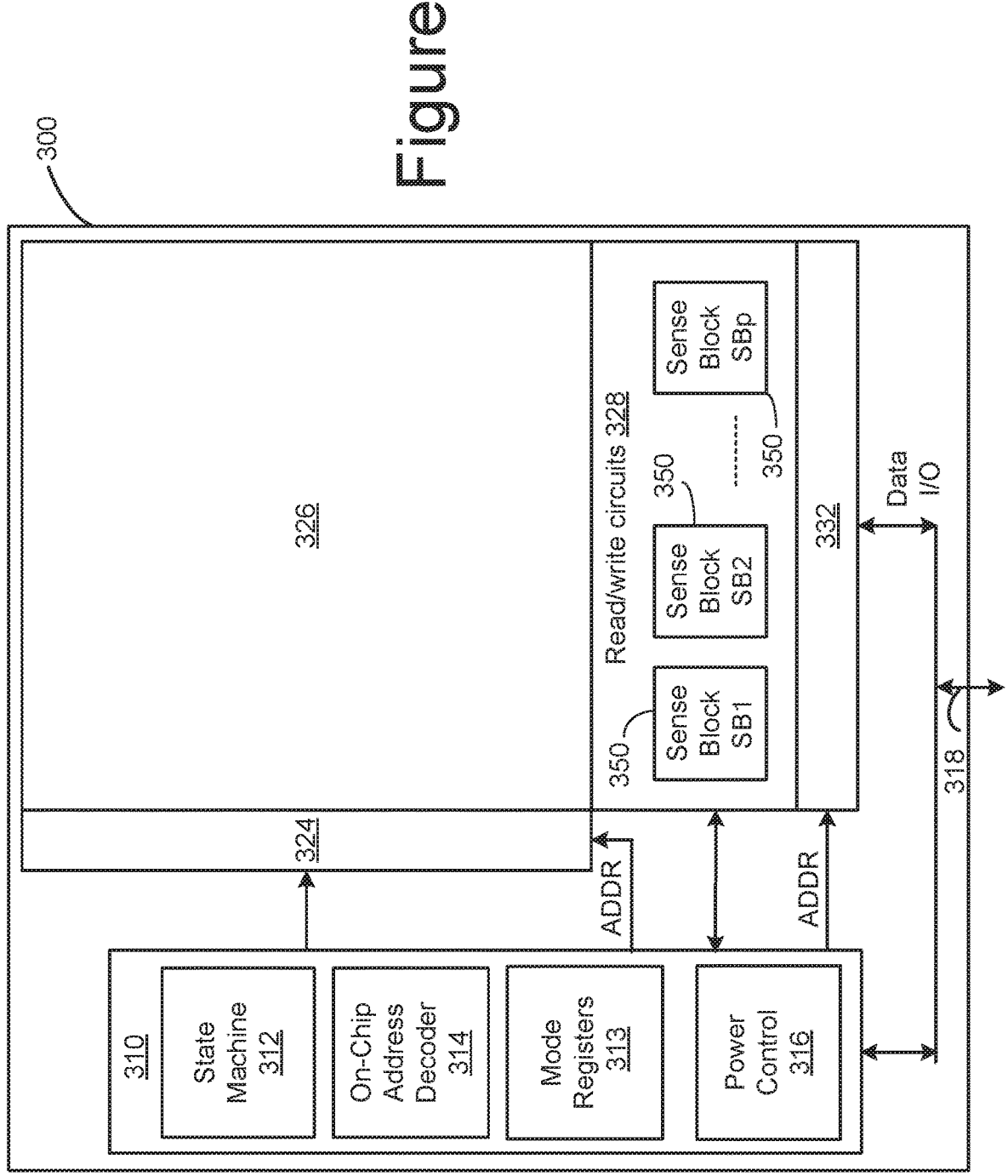
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between the controller and the memory die 300 via lines 318. In one embodiment, memory die 300 includes a set of input and/or output (I/O) pins that connect to lines 318.

Control circuitry 310 cooperates with the read/write circuits 328 to perform memory operations (e.g., write, read, and others) on memory structure 326, and includes a state machine 312, an on-chip address decoder 314, and a power control circuit 316. State machine 312 provides die-level control of memory operations. In one embodiment, state machine 312 is programmable by software. In other embodiments, state machine 312 does not use software and is completely implemented in hardware (e.g., electrical circuits). In another embodiment, state machine 312 is replaced by a micro-controller. In one embodiment, control circuitry 310 includes buffers such as registers, ROM fuses and other storage devices for storing default values such as base voltages and other parameters. The registers can include mode registers 313, which can include an accuracy mode register (ACMR) and low rank mode register (LRMR), as discussed below with respect to FIGS. 22 and 23.

The on-chip address decoder 314 provides an address interface between addresses used by controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

For purposes of this document, the phrase "one or more control circuits" can include a controller, a state machine, a micro-controller and/or control circuitry 310, or other analogous circuits that are used to control non-volatile memory.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 326 include two dimensional arrays, three dimensional arrays, cross-point arrays, stacked two dimensional arrays, vertical bit line arrays, and the like.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5 can be grouped into two parts, the memory structure 326 of the memory cells and the peripheral circuitry, including all of the other elements. An important characteristic of a memory circuit is its capacity, which can be increased by increasing the area of the memory die 300 that is given over to the memory structure 326; however, this reduces the area of the memory die 300 available for the peripheral circuitry. This can place quite severe restrictions on these peripheral elements. For example, the need to fit sense amplifier circuits within the available area can be a significant restriction on sense amplifier design architectures. With respect to the on-die control circuitry 310, reduced availability of area can limit the available functionalities that can be implemented on-chip. Consequently, a basic trade-off in the design of a memory die 300 is the amount of area to devote to the memory structure 326 and the amount of area to devote to the peripheral circuitry.

Another area in which the memory structure 326 and the peripheral circuitry are often at odds is in the processing involved in forming these regions, since these regions often involve differing processing technologies and the trade-off in having differing technologies on a single die. For example, when the memory structure 326 is NAND flash, this is an NMOS structure, while the peripheral circuitry is often CMOS based. For example, sense amplifier circuits in the sense blocks 350, charge pumps in the power control block 316, logic elements in the state machine 312, and other peripheral circuitry often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 5 onto separately formed dies that are then bonded together. More specifically, the memory structure 326 can be formed on one die and some or all of the peripheral circuitry elements, including one or more control circuits, can be formed on a separate die. For example, a memory die can be formed of just the memory elements, such as the array of memory cells of flash NAND memory, a PCM memory, a ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 6A:
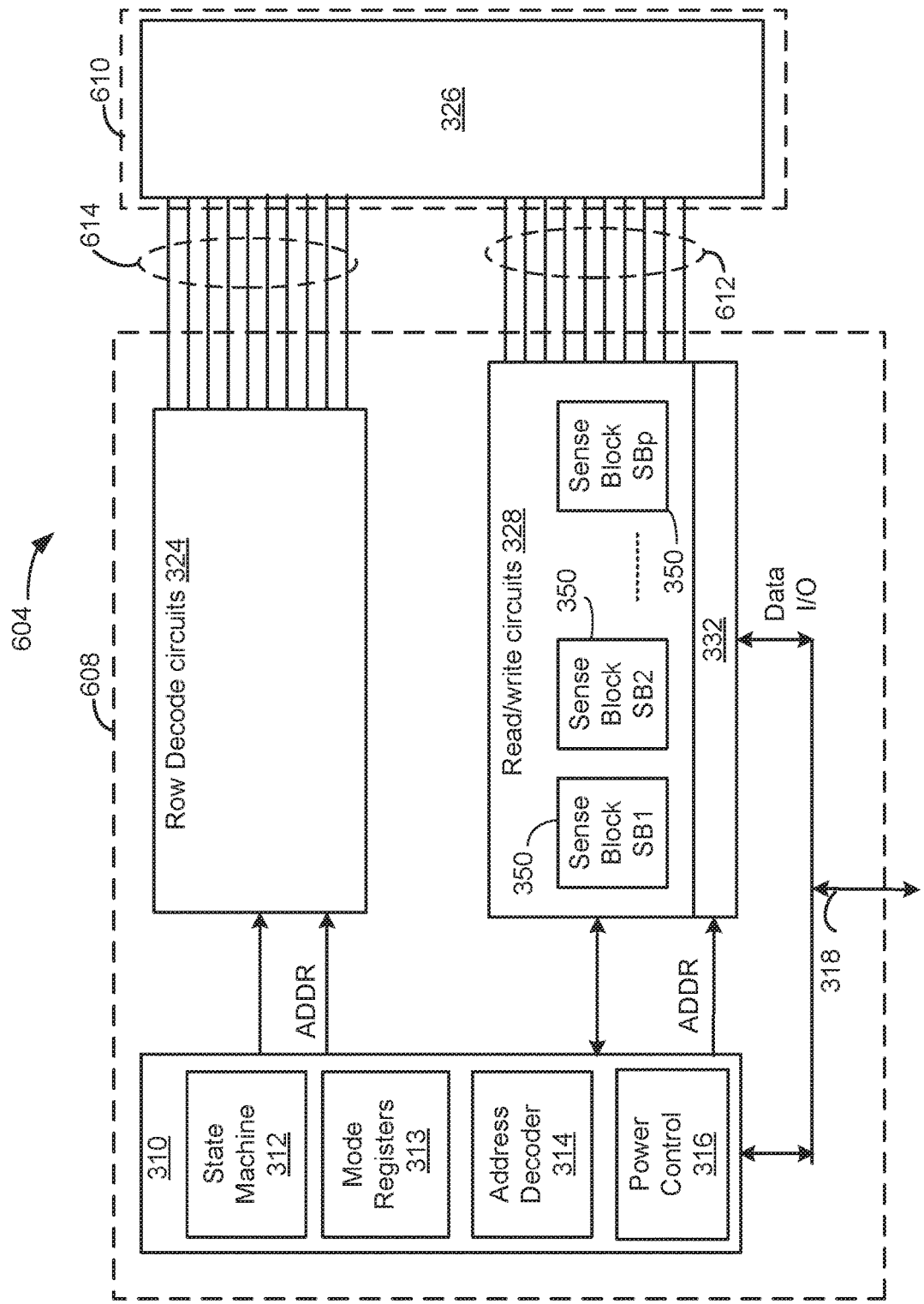
FIGS. 6A and 6B illustrates an example of control circuits coupled to a memory structure through wafer-to-wafer bonding.
Figure 6B:
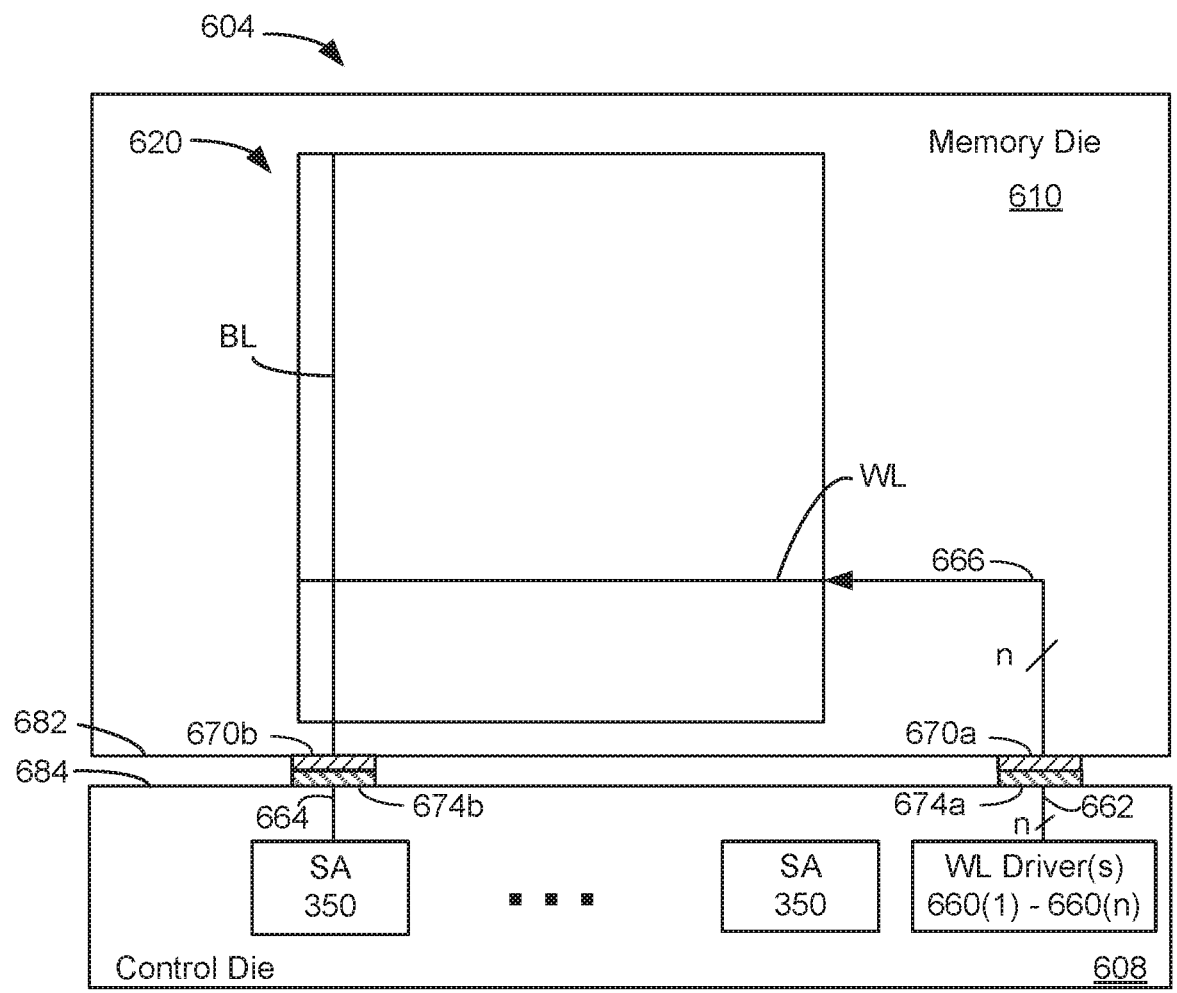

FIGS. 6A and 6B shows an alternative arrangement to that of FIG. 5, which may be implemented using wafer-to-wafer bonding to provide a bonded die pair 604. FIG. 6A shows an example of the peripheral circuitry, including control circuits, formed in a peripheral circuit or control die 608 coupled to memory structure 326 formed in memory die 610. Common components are numbered as in FIG. 5. It can be seen that control circuitry 310, read/write circuits 328, and row decoder 324 (which may be formed by a CMOS process) are located in control die 608 Additional elements, such as functionalities from controller 102 can also be moved into the control die 608. Control circuitry 310, read/write circuits 328, row decoder 324, and column decoder 332 may be formed by a common process (e.g., CMOS process), so that adding elements and functionalities more typically found on a memory controller 102 may require few or no additional process steps (i.e., the same process steps used to fabricate controller 102 may also be used to fabricate control circuitry 310, read/write circuits 328, and row decoder 324). Thus, while moving such circuits from a die such as memory die 300 may reduce the number of steps needed to fabricate such a die, adding such circuits to a die such as control die 608 may not require any additional process steps.

FIG. 6A shows read/write circuits 328 on the control die 608 coupled to memory structure 326 on the memory die 610 through electrical paths 612. For example, electrical paths 612 may provide electrical connection between read/write circuits 328 and bit lines of memory structure 326. Electrical paths may extend from read/write circuits 328 in control die 608 through pads on control die 608 that are bonded to corresponding pads of the memory die 610, which are connected to bit lines of memory structure 326. Each bit line of memory structure 326 may have a corresponding electrical path in electrical paths 612, including a pair of bonded pads, that connects to read/write circuits 328. Similarly, row decoder circuits 324 are coupled to memory structure 326 through electrical paths 614. Each of electrical path 614 may correspond to a word line, dummy word line, or select gate line. Additional electrical paths may also be provided between control die 608 and memory die 610.

FIG. 6B is a block diagram showing more detail on the arrangement of one embodiment of the integrated memory assembly of bonded die pair 604. Memory die 610 contains a plane 620 or array of memory cells. The memory die 610 may have additional planes or arrays. One representative bit line (BL) and representative word line (WL) is depicted for each plane or array 620. There may be thousands or tens of thousands of such bit lines per each plane or array 620. In one embodiment, an array or plane represents a groups of connected memory cells that share a common set of unbroken word lines and unbroken bit lines.

Control die 608 includes a number of sense amplifiers (SA) 350. Each sense amplifier 350 is connected to one bit line or may be connected to multiple bit lines in some embodiments. The sense amplifier contains a bit line driver. Thus, the sense amplifier may provide a voltage to the bit line to which it is connected. The sense amplifier is configured to sense a condition of the bit line. In one embodiment, the sense amplifier is configured to sense a current that flows in the bit line. In one embodiment, the sense amplifier is configured to sense a voltage on the bit line.

The control die 608 includes a number of word line drivers 660(1)-660(n). The word line drivers 660 are configured to provide voltages to word lines. In this example, there are "n" word lines per array or plane memory cells. If the memory operation is a program or read, one word line within the selected block is selected for the memory operation, in one embodiment. If the memory operation is an erase, all of the word lines within the selected block are selected for the erase, in one embodiment. The word line drivers 660 (e.g., part of Power Control 316) provide voltages to the word lines in memory die 610. As discussed above with respect to FIG. 6A, the control die 608 may also include charge pumps, voltage generators, and the like that are not represented in FIG. 6B, which may be used to provide voltages for the word line drivers 660 and/or the bit line drivers.

The memory die 610 has a number of bond pads 670a, 670b on a first major surface 682 of memory die 610. There may be "n" bond pads 670a, to receive voltages from a corresponding "n" word line drivers 660(1)-660(n). There may be one bond pad 670b for each bit line associated with plane 620. The reference numeral 670 will be used to refer in general to bond pads on major surface 682.

In some embodiments, each data bit and each parity bit of a codeword are transferred through a different bond pad pair 670b, 674b. The bits of the codeword may be transferred in parallel over the bond pad pairs 670b, 674b. This provides for a very efficient data transfer relative to, for example, transferring data between the memory controller 102 and the integrated memory assembly 604. For example, the data bus between the memory controller 102 and the integrated memory assembly 604 may, for example, provide for eight, sixteen, or perhaps 32 bits to be transferred in parallel. However, the data bus between the memory controller 102 and the integrated memory assembly 604 is not limited to these examples.

The control die 608 has a number of bond pads 674a, 674b on a first major surface 684 of control die 608. There may be "n" bond pads 674a, to deliver voltages from a corresponding "n" word line drivers 660(1)-660(n) to memory die 610. There may be one bond pad 674b for each bit line associated with plane 620. The reference numeral 674 will be used to refer in general to bond pads on major surface 682. Note that there may be bond pad pairs 670a/674a and bond pad pairs 670b/674b. In some embodiments, bond pads 670 and/or 674 are flip-chip bond pads.

In one embodiment, the pattern of bond pads 670 matches the pattern of bond pads 674. Bond pads 670 are bonded (e.g., flip chip bonded) to bond pads 674. Thus, the bond pads 670, 674 electrically and physically couple the memory die 610 to the control die 608.

Also, the bond pads 670, 674 permit internal signal transfer between the memory die 610 and the control die 608. Thus, the memory die 610 and the control die 608 are bonded together with bond pads. Although FIG. 6A depicts one control die 608 bonded to one memory die 610, in another embodiment one control die 608 is bonded to multiple memory dies 610.

Herein, "internal signal transfer" means signal transfer between the control die 608 and the memory die 610. The internal signal transfer permits the circuitry on the control die 608 to control memory operations in the memory die 610. Therefore, the bond pads 670, 674 may be used for memory operation signal transfer. Herein, "memory operation signal transfer" refers to any signals that pertain to a memory operation in a memory die 610. A memory operation signal transfer could include, but is not limited to, providing a voltage, providing a current, receiving a voltage, receiving a current, sensing a voltage, and/or sensing a current.

The bond pads 670, 674 may be formed for example of copper, aluminum and alloys thereof. There may be a liner between the bond pads 670, 674 and the major surfaces (682, 684). The liner may be formed for example of a titanium/titanium nitride stack. The bond pads 670, 674 and liner may be applied by vapor deposition and/or plating techniques. The bond pads and liners together may have a thickness of 720 nm, though this thickness may be larger or smaller in further embodiments.

Metal interconnects and/or vias may be used to electrically connect various elements in the dies to the bond pads 670, 674. Several conductive pathways, which may be implemented with metal interconnects and/or vias are depicted. For example, a sense amplifier 350 may be electrically connected to bond pad 674b by pathway 664. Relative to FIG. 6A, the electrical paths 612 can correspond to pathway 664, bond pads 674b, and bond pads 670b. There may be thousands of such sense amplifiers, pathways, and bond pads. Note that the BL does not necessarily make direct connection to bond pad 670b. The word line drivers 660 may be electrically connected to bond pads 674a by pathways 662. Relative to FIG. 6A, the electrical paths 614 can correspond to the pathway 662, the bond pads 674a, and bond pads 670a. Note that pathways 662 may comprise a separate conductive pathway for each word line driver 660(1)-660(n). Likewise, a there may be a separate bond pad 674a for each word line driver 660(1)-660(n). The word lines in block 2 of the memory die 610 may be electrically connected to bond pads 670a by pathways 664. In FIG. 6B, there are "n" pathways 664, for a corresponding "n" word lines in a block. There may be separate pair of bond pads 670a, 674a for each pathway 664.

Relative to the on-die control circuits of FIG. 6A can also include addition functionalities within its logic elements, both more general capabilities than are typically found in the memory controller 102 and some CPU capabilities, but also application specific features. For example, these activation functions can include addition and threshold determination operations used in the accumulation portion of Multiple and ACcumulation (MAC) operations, but more advanced operations such as sigmoid or tanh functions.

In the following, state machine 312 and/or controller 102 (or equivalently functioned circuits), in combination with all or a subset of the other circuits depicted on the control die 608 in FIG. 6A and similar elements in FIG. 5, can be considered part of the one or more control circuits that perform the functions described herein. The control circuits can include hardware only or a combination of hardware and software (including firmware). For example, a controller programmed by firmware to perform the functions described herein is one example of a control circuit. A control circuit can include a processor, FGA, ASIC, integrated circuit or other type of circuit.

Turning now to types of data that can be stored in non-volatile memory devices, a particular example of the type of data of interest in the following discussion is the weights used is in artificial neural networks, such as convolutional neural networks or CNNs. The name "convolutional neural network" indicates that the network employs a mathematical operation called convolution, that is a specialized kind of linear operation. Convolutional networks are neural networks that use convolution in place of general matrix multiplication in at least one of their layers. A CNN is formed of an input and an output layer, with a number of intermediate hidden layers. The hidden layers of a CNN are typically a series of convolutional layers that "convolve" with a multiplication or other dot product.

Each neuron in a neural network computes an output value by applying a specific function to the input values coming from the receptive field in the previous layer. The function that is applied to the input values is determined by a vector of weights and a bias. Learning, in a neural network, progresses by making iterative adjustments to these biases and weights. The vector of weights and the bias are called filters and represent particular features of the input (e.g., a particular shape). A distinguishing feature of CNNs is that many neurons can share the same filter.

Figure 7:
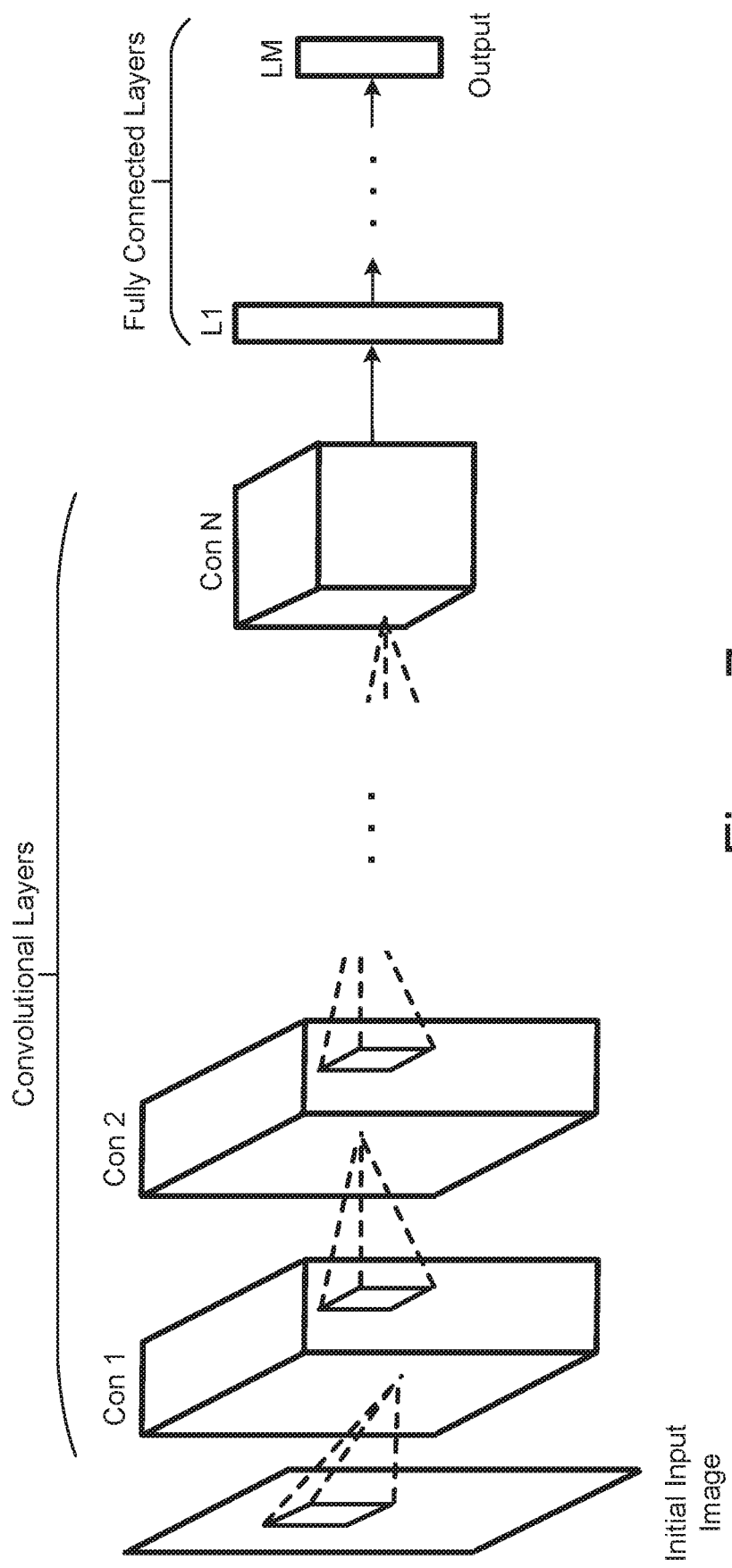
FIG. 7 illustrates a simple example of a convolutional neural network (CNN).

FIG. 7 is a schematic representation of an example of a CNN. FIG. 7 illustrates an initial input image of an array of pixel values, followed by a number convolutional layers that are in turn followed by a number of fully connected layers, the last of which provides the output. Each neuron in the first convolutional layer (Con 1) takes as input data from an n×n pixel sub-region of the input image. The neuron's learned weights, which are collectively referred to as its convolution filter, determine the neuron's single-valued output in response to the input. In the convolutional layers, a neuron's filter is applied to the input image by sliding the input region along the image's x and y dimensions to generate the values of the convolutional layer. In practice, the equivalent convolution is normally implemented by statically identical copies of the neuron to different input regions. The process is repeated through each of the convolutional layers (Coni to Con N) using each layer's learned weights, after which it is propagated through the fully connected layers (L1 to LM) using their learned weights.

Figure 8:
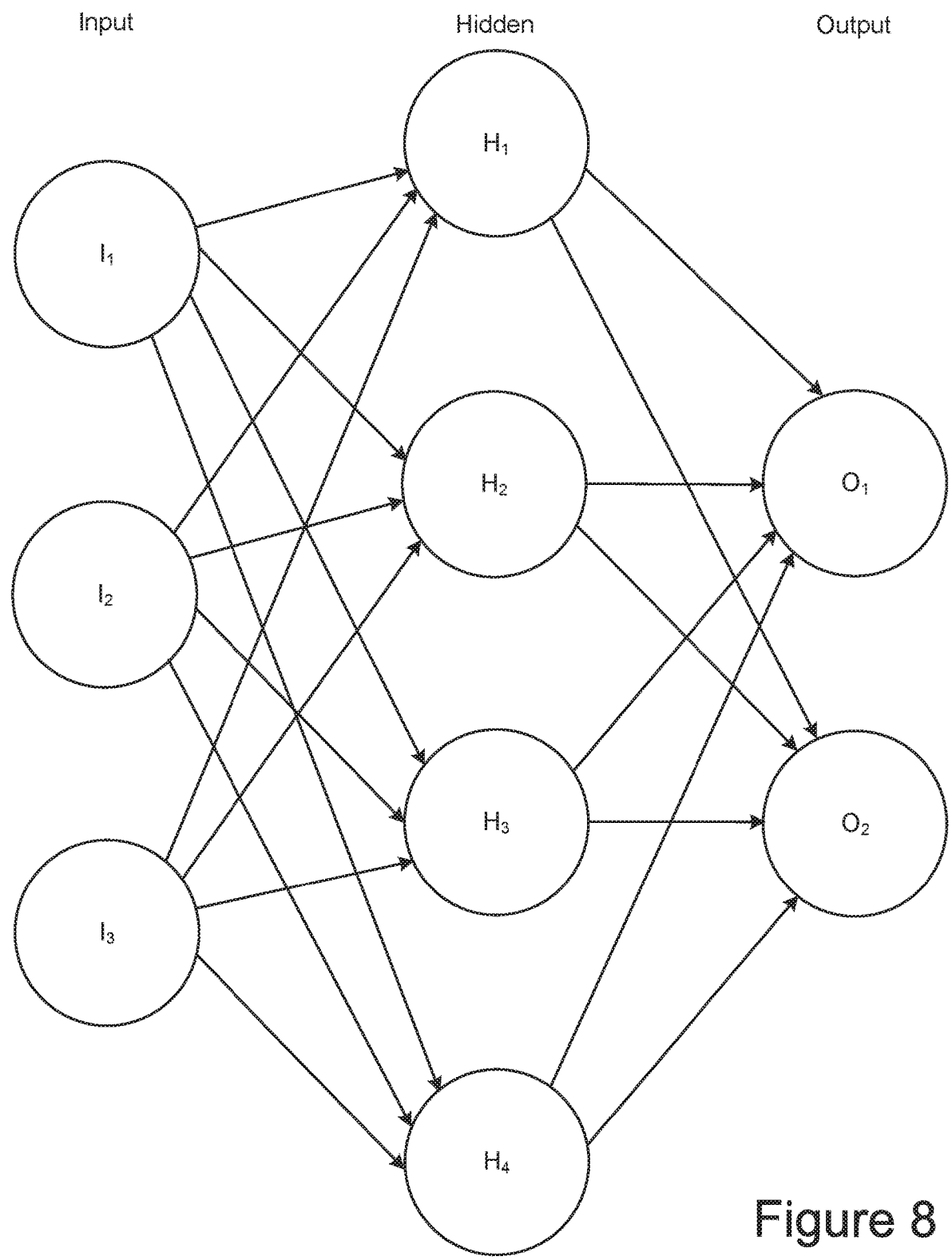
FIG. 8 illustrates a simple example of fully connected layers in an artificial neural network.

FIG. 8 represents several fully connected layers of a neural network in more detail. In FIG. 8 the shown three layers of the artificial neural network are represented as an interconnected group of nodes or artificial neurons, represented by the circles, and a set of connections from the output of one artificial neuron to the input of another. The example shows three input nodes ($I_1, I_2, I_3$) and two output nodes ($O_1, O_2$), with an intermediate layer of four hidden or intermediate nodes ($H_1, H_2, H_3, H_4$). The nodes, or artificial neurons/synapses, of the artificial neural network are implemented by logic elements of a host or other processing system as a mathematical function that receives one or more inputs and sums them to produce an output. Usually each input is separately weighted and the sum is passed through the node's mathematical function to provide the node's output.

In common artificial neural network implementations, the signal at a connection between nodes (artificial neurons/synapses) is a real number, and the output of each artificial neuron is computed by some non-linear function of the sum of its inputs. Nodes and their connections typically have a weight that adjusts as a learning process proceeds. The weight increases or decreases the strength of the signal at a connection. Nodes may have a threshold such that the signal is only sent if the aggregate signal crosses that threshold. Typically, the nodes are aggregated into layers. Different layers may perform different kinds of transformations on their inputs. Signals travel from the first layer (the input layer), to the last layer (the output layer), possibly after traversing the layers multiple times. Although FIG. 7 shows only a single intermediate or hidden layer, a complex deep neural network (DNN) can have many such intermediate layers.

A supervised artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex non-linear relationships as they are trained.

Figure 9B:
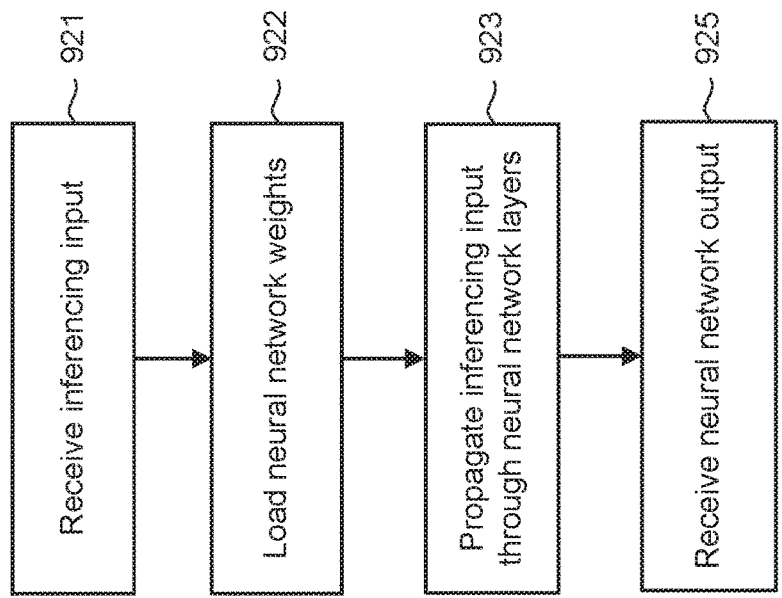
FIG. 9B is a flowchart describing one embodiment of a process for inference using a neural network.
Figure 9A:
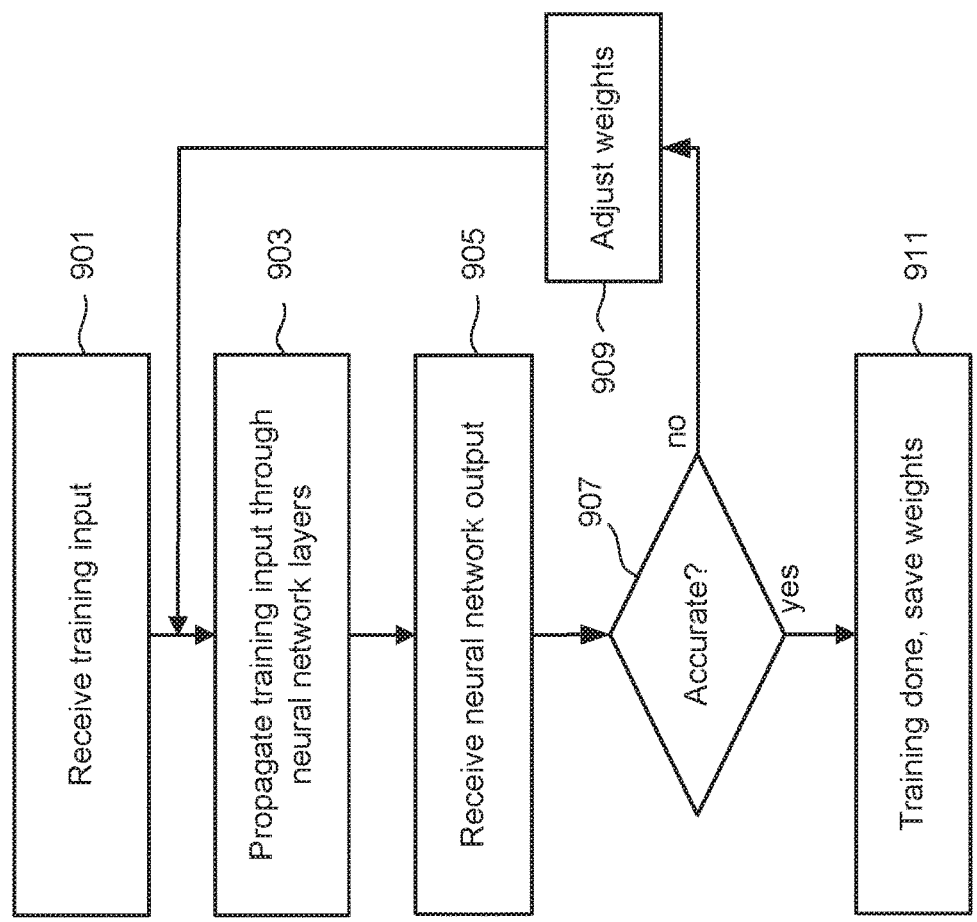
FIG. 9A is a flowchart describing one embodiment of a process for training a neural network to generate a set of weights.

FIG. 9A is a flowchart describing one embodiment of a process for training a neural network to generate a set of weights. The training process is often performed in the cloud, allowing additional or more powerful processing to be accessed. At step 901, the input, such as a set of images, is received (e.g., the image input in FIG. 7). At step 903 the input is propagated through the layers connecting the input to the next layer (e.g., CON1 in FIG. 7) using the current filter, or set of weights. The neural network's output is then received at the next layer (e.g., CON2 in FIG. 7) in step 905, so that the values received as output from one layer serve as the input to the next layer. The inputs from the first layer are propagated in this way through all of the intermediate or hidden layers until they reach the output. In the dog breed example of the preceding paragraph, the input would be the image data of a number of dogs, and the intermediate layers use the current weight values to calculate the probability that the dog in an image is a certain breed, with the proposed dog breed label returned at step 905. A user can then review the results at step 907 to select which probabilities the neural network should return and decide whether the current set of weights supply a sufficiently accurate labelling and, if so, the training is complete (step 911). If the result is not sufficiently accurate, the neural network adjusts the weights at step 909 based on the probabilities the user selected, followed by looping back to step 903 to run the input data again with the adjusted weights. Once the neural network's set of weights have been determined, they can be used to "inference," which is the process of using the determined weights to generate an output result from data input into the neural network. Once the weights are determined at step 911, they can then be stored in non-volatile memory for later use, where the storage of these weights in non-volatile memory is discussed in further detail below.

FIG. 9B is a flowchart describing a process for the inference phase of supervised learning using a neural network to predict the "meaning" of the input data using an estimated accuracy. Depending on the case, the neural network may be inferenced both in the cloud and by an edge device's (e.g., smart phone, automobile process, hardware accelerator) processor. At step 921, the input is received, such as the image of a dog in the example used above. If the previously determined weights are not present in the device running the neural network application, they are loaded at step 922. For example, on a host processor executing the neural network, the weights could be read out of an SSD in which they are stored and loaded into RAM on the host device. At step 923, the input data is then propagated through the neural network's layers. Step 923 will be similar to step 903 of FIG. 9B, but now using the weights established at the end of the training process at step 911. After propagating the input through the intermediate layers, the output is then provided at step 925.

Figure 10:
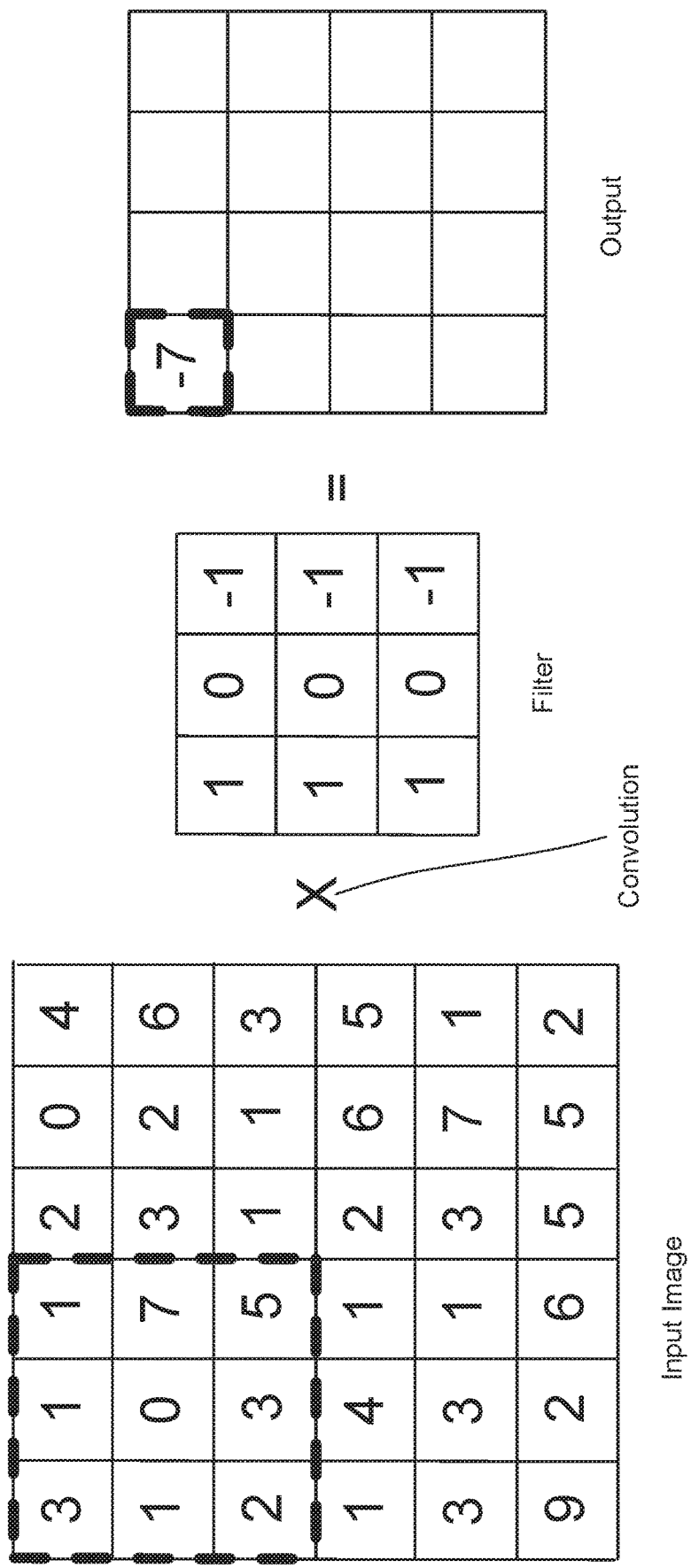
FIG. 10 is a schematic representation of a convolution operation in a convolutional neural network.

FIG. 10 is a schematic representation of a convolution operation between an input image and filter, or set of weights. In this example, the input image is a 6×6 array of pixel values and the filter is a 3×3 array of weights. The convolution operation is performed by a matrix multiplication of the 3×3 filter with 3×3 blocks of the input image. For example, the multiplication of the upper-left most 3×3 block of the image with the filter results in the top left value of the output matrix. The filter can then be slid across by one pixel on the image to generate the next entry of the output, and so on to generate a top row of 4 elements for the output. By repeating this by sliding the filter down a pixel at a time, the 4×4 output matrix is generated. Similar operations are performed for each of the layers. In a real CNN, the size of the data sets and the number of convolutions performed mean that extremely large numbers of such operations are performed involving very large amounts of data.

Figure 11:
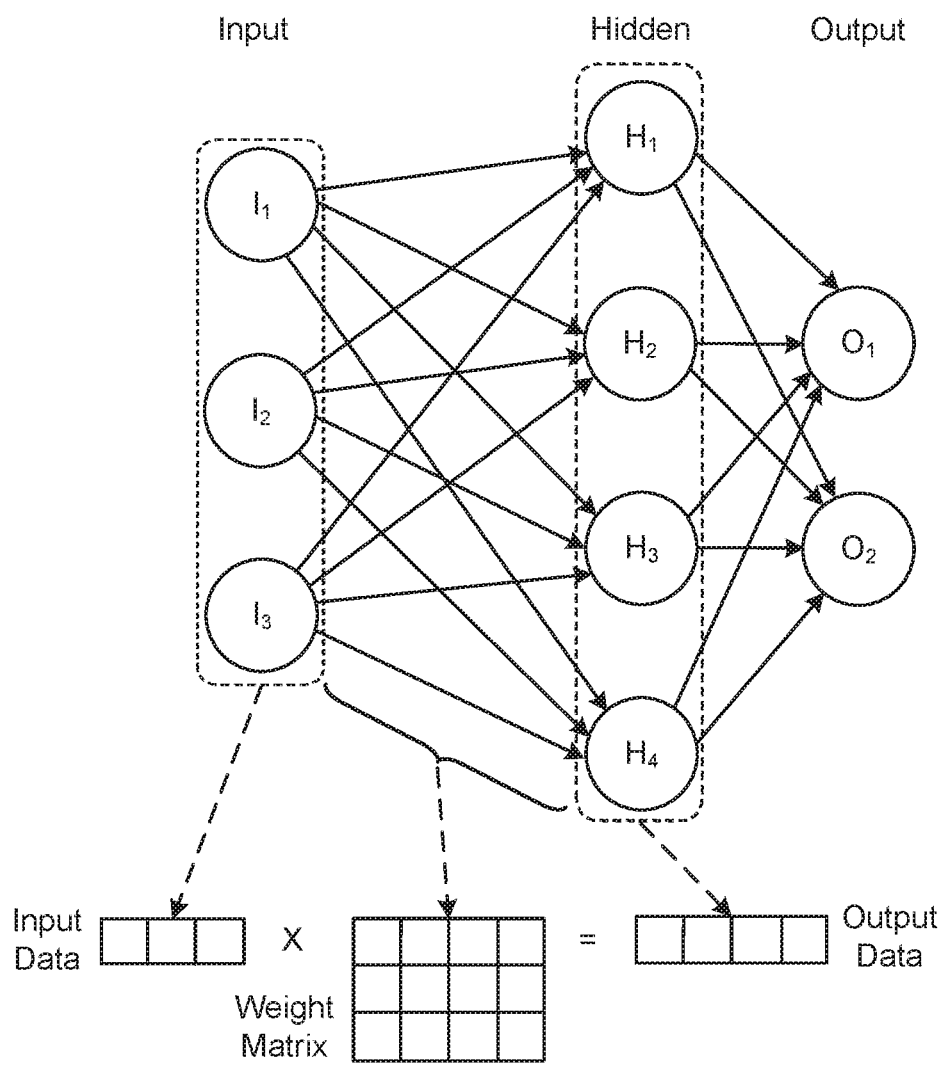
FIG. 11 is a schematic representation of the use of matrix multiplication in a fully connected layer of a neural network.

FIG. 11 is a schematic representation of the use of matrix multiplication in a fully connected layer of a neural network. Matrix multiplication, or MatMul, is a commonly used approach in both the training and inference phases for neural networks and is used in kernel methods for machine learning. FIG. 11 at the top is similar to FIG. 8, where only a single hidden layer is shown between the input layer and the output layer. The input data is represented as a vector of a length corresponding to the number of input nodes. The weights are represented in a weight matrix, where the number of columns corresponds to the number of intermediate nodes in the hidden layer and the number of rows corresponds to the number of input nodes. The output is determined by a matrix multiplication of the input vector and the weight matrix, where each element of the output vector is a dot product of the vector of the input data with a column of the weight matrix.

A common technique for executing the matrix multiplications is by use of a multiplier-accumulator (MAC, or MAC unit). However, this has a number of issues. Referring back to FIG. 9B, the inference phase loads the neural network weights at step 922 before the matrix multiplications are performed by the propagation at step 923. However, as the amount of data involved can be extremely large, use of a multiplier-accumulator for inferencing has several issues related to the loading of weights. One of these issues is high energy dissipation due to having to use large MAC arrays with the required bit-width. Another issue is high energy dissipation due to the limited size of MAC arrays, resulting in high data movement between logic and memory and an energy dissipation that can be much higher than used in the logic computations themselves.

To help avoid these limitations, the use of a multiplier-accumulator array can be replaced with other memory technologies. For example, the matrix multiplication can be computed within a memory array by leveraging the characteristics of NAND memory and Storage Class Memory (SCM), such as those based on ReRAM, PCM, FeRAM or MRAM based memory cells. This allows for the neural network inputs to be provided via read commands and the neural weights to be preloaded for inferencing. By use of in-memory computing, this can remove the need for logic to perform the matrix multiplication in the MAC array and the need to move data between the memory and the MAC array.

The following presents embodiments for compute in memory DNNs that use the concept of a low-rank approximation for the weight matrices in order to improve performance and energy efficiency. As described in more detail below, in a low-rank approximation, a weight matrix is replaced with the product of three matrices. Although the results of one multiply and accumulate operation is replaced with three such operations, the combined operation will require the storage of less weight values and will involve simpler multiply and accumulate operations, so that performance and energy efficiency will be improved.

Figure 12:
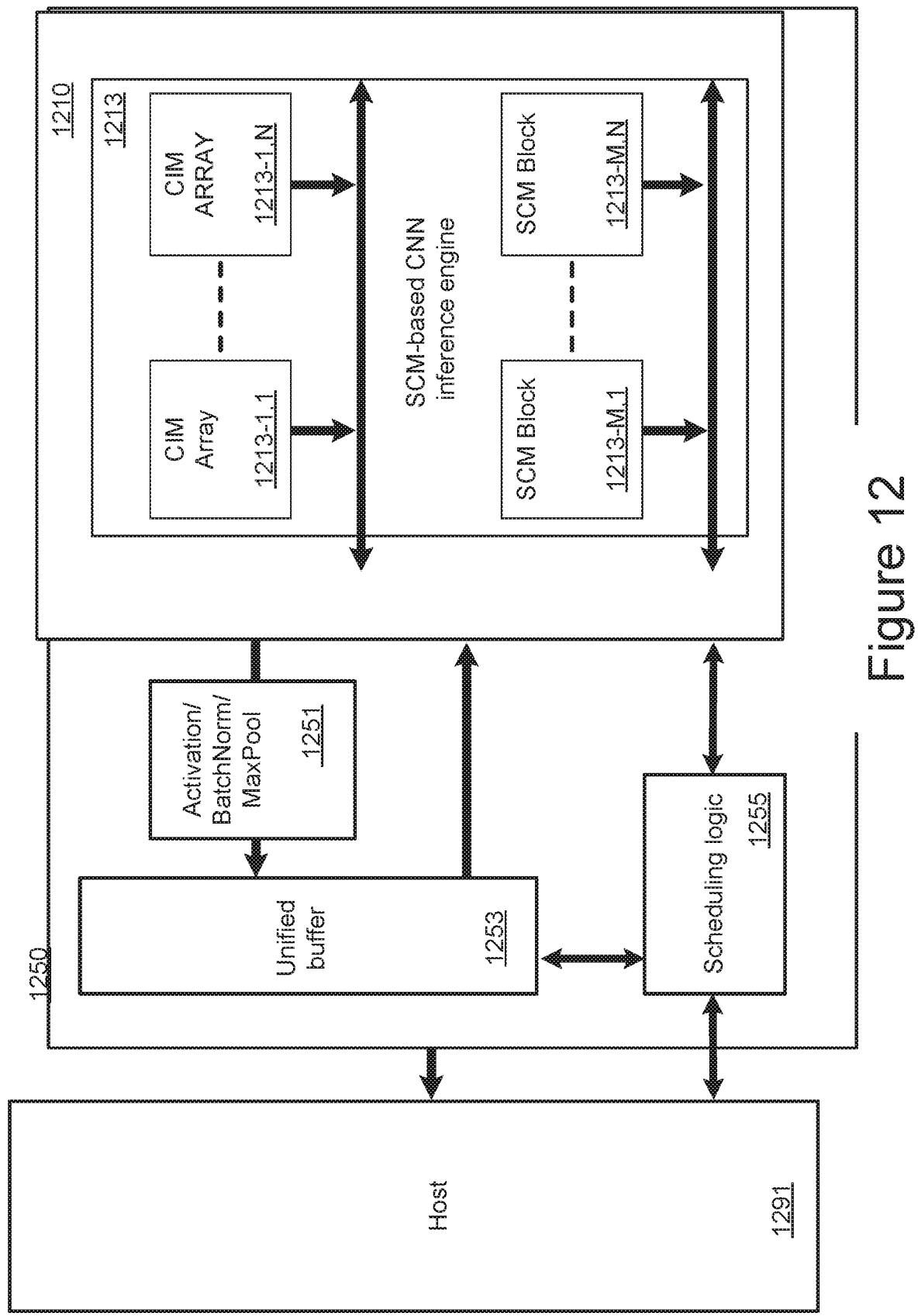
FIG. 12 is a block diagram of a high-level architecture of a compute in memory Deep Neural Networks (DNN) inference engine that provide context for the follow discussion.

FIG. 12 is a block diagram of a high-level architecture of an embodiment for a compute in memory DNN inference engine that provides context for the follow discussion. In FIG. 12, a non-volatile memory device 1250 includes a memory die 1210 of multiple memory blocks 1213 represented as M rows and N columns of arrays, including a general SCM-based memory portion, of which two blocks 1213-(M,1) and 1213-(M,N) are shown, and a compute in-memory (CIM) DNN inference engine portion, of which two blocks 2213-(1,1) and 1213-(1,N) are shown. Each of the CIM blocks of memory die 1210 can be operated to compute in-memory the multiply and accumulate operations of a DNN as described below. The memory die 1210 of FIG. 12 only represents the memory blocks, but can also include additional peripheral/control elements of FIG. 5 or be the memory die of a bonded die pair as in FIG. 6A.

In addition to the one or more control circuits that generate the product values from the integrated circuit of memory die 1210, other elements on the memory device (such as on the controller 102) include a unified buffer 1253 that can buffer data being transferred from the host device 1291 to the memory die 1210 and also receive data from the memory die 1210 being transferred from to the host device 1291. For use in inferencing, neural network operations such as activation, batch normalization, and max pooling 1251 can be performed by processing on the controller for data from the memory die 1210 before it is passed on to the unified buffer 1253. Scheduling logic 1255 can oversee the inferencing operations.

In the embodiment of FIG. 12, the memory die 1210 is storage class memory, but in other embodiments can be NAND memory or based on other memory technologies. In the embodiment of FIG. 12, the memory die includes a number of SCM memory blocks or sub-arrays 1213-$i,j$, some that are configured to operate as a compute in-memory (CIM) DNN inference engine and others that can work as basic memory and can be employed, for examples, as buffers in a multiple layer neural network or a large neural network that cannot fit in a single memory device. The embodiment of FIG. 12 can be referred to as having inter-chip heterogenous functions. In alternate embodiments, an intra-chip heterogenous arrangement of multiple memory die chips can be used, were some chips support DNN inference, while others are basic memory, or where the two variations can be combined.

A compute in memory approach to DNNs can have a number of advantages for machine learning applications operating in energy-limited systems. The weights are stationary stored in the SCM arrays 1213 of the DNN inference engine, thus eliminating unnecessary data movement from/to the host. The input data can be programmed by the host 1291 to access CIM arrays such as 1213-1,1 and 1213-1,N and computational logic can be replaced by memory cell access. The compute in memory DNN inference engine can be integrated as accelerators to support machine learning applications in the larger memory system or for a host device (e.g., 1291). Additionally, the structure is highly scalable with model size.

Although a conventional compute in memory DNN architecture allows large models to be mapped, it is still limited by system energy constraints. Therefore, the following presents methods and an architecture for a compute in memory DNN which that can help to overcome these limitations. More specifically, the architecture can support compressed models for deep neural networks (DNNs) by use and support of Low Rank Approximations (LRAs) techniques and low rank approximation-based models. Further, techniques are presented to co-optimization flows to search and configure compute in memory DNNs into high performance energy efficient operation modes under host control and accuracy constraints.

In a low rank approximation analysis, a singular value decomposition can be applied to a weight matrix of dimension M×N, $W_{M \times N}$. Under a singular value decomposition, the weight matrix is rewritten as:

$$W_{M \times N} = U_{M \times M} \Sigma_{M \times N} V^*_{N \times N}$$

where U is an M×M left-singular vector (unitary matrix), $\Sigma$ is an M×N matrix of singular values (a descending diagonal matrix), and V* is a conjugate transpose of an N×N right singular vector (unitary matrix). (This process is similar to the concept of a spectral decomposition of a symmetric matrix.) As $\Sigma$ can be put into the form of a descending diagonal matrix, each of the values along diagonal will be decreasing (or non-increasing) as the row/column index increases. In other embodiments, a decomposition can be performed in which $\Sigma$ is a diagonal matrix, but not descending; however, the following discussion will assume a descending diagonal matrix as this has a number of practical advantages, particularly when operating in the "HPEE" mode described below.

Singular value decomposition-based low rank approximation refers to finding an optimal low rank matrix $W_R$ from W by solving the optimization problem of, for a given amount of error $\varepsilon$, finding a minimum value of R such that:

$$\min_R \|W - W_R\|_F \leq \varepsilon,$$

where $$W_R = U_{M \times R} \Sigma_{R \times R} V^*_{R \times N},$$

R<highest rank $R^{MAX}$ of W=min(M,N), $\|.\|$ is the Frobenius norm (i.e., $\|A\|_F$ is the square root of trace (A*A)), and $\varepsilon$ is the (positive) error threshold.

Figures 13, 14:
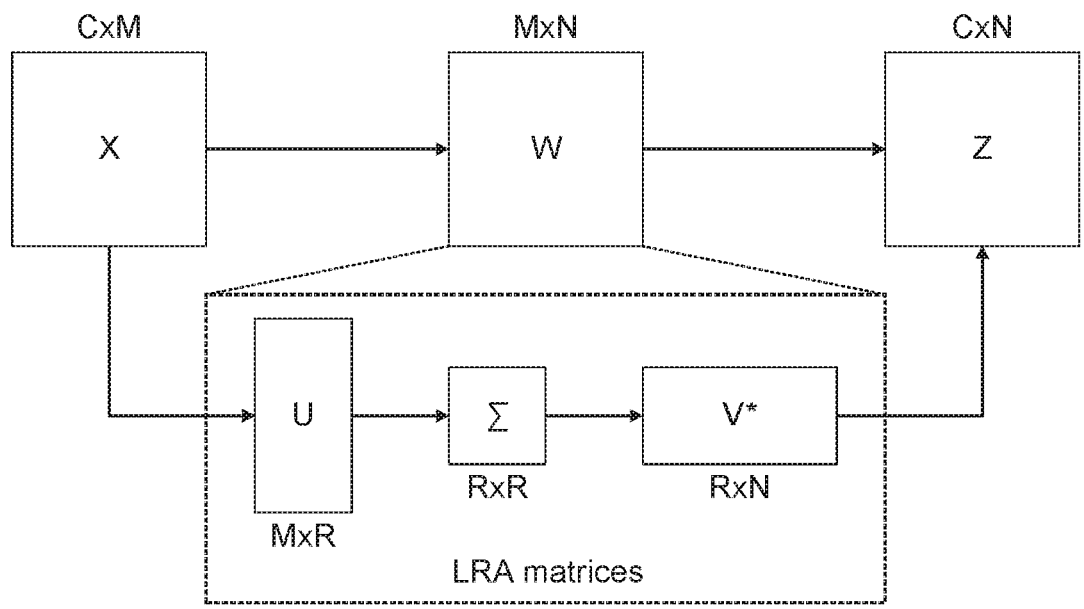
FIG. 13 illustrates the replacement of a weight matrix with its low rank approximation.
FIG. 14 is a table comparing the complexity of a conventional architecture with the complexity of the corresponding low rank approximation (LRA) based architecture.

FIG. 13 illustrates the replacement of a weight matrix with its low rank approximation in a fully connected layer. A weight matrix W of size M×N is multiplied by an input matrix X of size C×M, resulting in an output matrix of size C×N. In the low rank approximation, the original weight matrix is replaced by the product U·Σ·V that have respective sizes M×R, R×R, and R×N. Consequently, the single multiply-accumulate operation for the single original matrix is replaced by three multiply-accumulate operations for the LRA matrices. However, although more operations are required, due the reduction in size of the LRA matrices, and the diagonality of the $\Sigma$ matrix, the complexity is reduced.

FIG. 14 is a table comparing the complexity of a conventional architecture with the complexity of the corresponding LRA-based architecture. In the table of FIG. 14, the parameters C, M are the input matrix (X) size; M, N are the original weight matrix (X) size; C, N are the output matrix (Z) size; and R is the low rank achieved by LRA for matrix $\Sigma$. In the table of FIG. 14, the complexity in terms of the number of multiply-accumulate operations is C*M*N, which, in the third column, is taken to have a normalized value of 1 for comparison purposes.

In the LRA-based approach, the combined complexity of the three multiply-accumulate operations is: C*R*M+C*R+C*R*N. As the matrix X is diagonal, much less computation is required than the others. Dividing this sum by the complexity of the conventional approach, this gives a normalized complexity of:

$$\frac{R * (M + N + 1)}{M * N}.$$

For a constant R, the LRA-based approach has O(M+N) complexity, while the conventional approach has O(M*N) complexity. Consequently, the LRA-based approach will typically have far fewer multiply-accumulate operations, reducing power consumption and increasing the speed of in-array operations.

For an original weight matrix of size M×N, minimizing of R can increase performance and energy efficiency by reducing of multiply-accumulate operations required for fully connected layers. The corresponding reduction in the model size results in a lower memory footprint, but if reduced too far can have an impact on accuracy. When applying LRA to DNNs, training is more involved as the DNN is first trained and then the singular value decomposition LRA process needs to be applied to the original weights determined during training. When inferencing, this is not a drawback for in-memory implementations, as the singular value decomposition is a one-time cost that can be computed off-line, but training can be challenging because online computing singular value decomposition incurs extra performance costs. The following discussion presents techniques to adaptively control the performance and energy efficiency for the fully-connected layers by fine/coarse-grained adjustment of the rank of weight matrices in LRA process.

Figure 15:
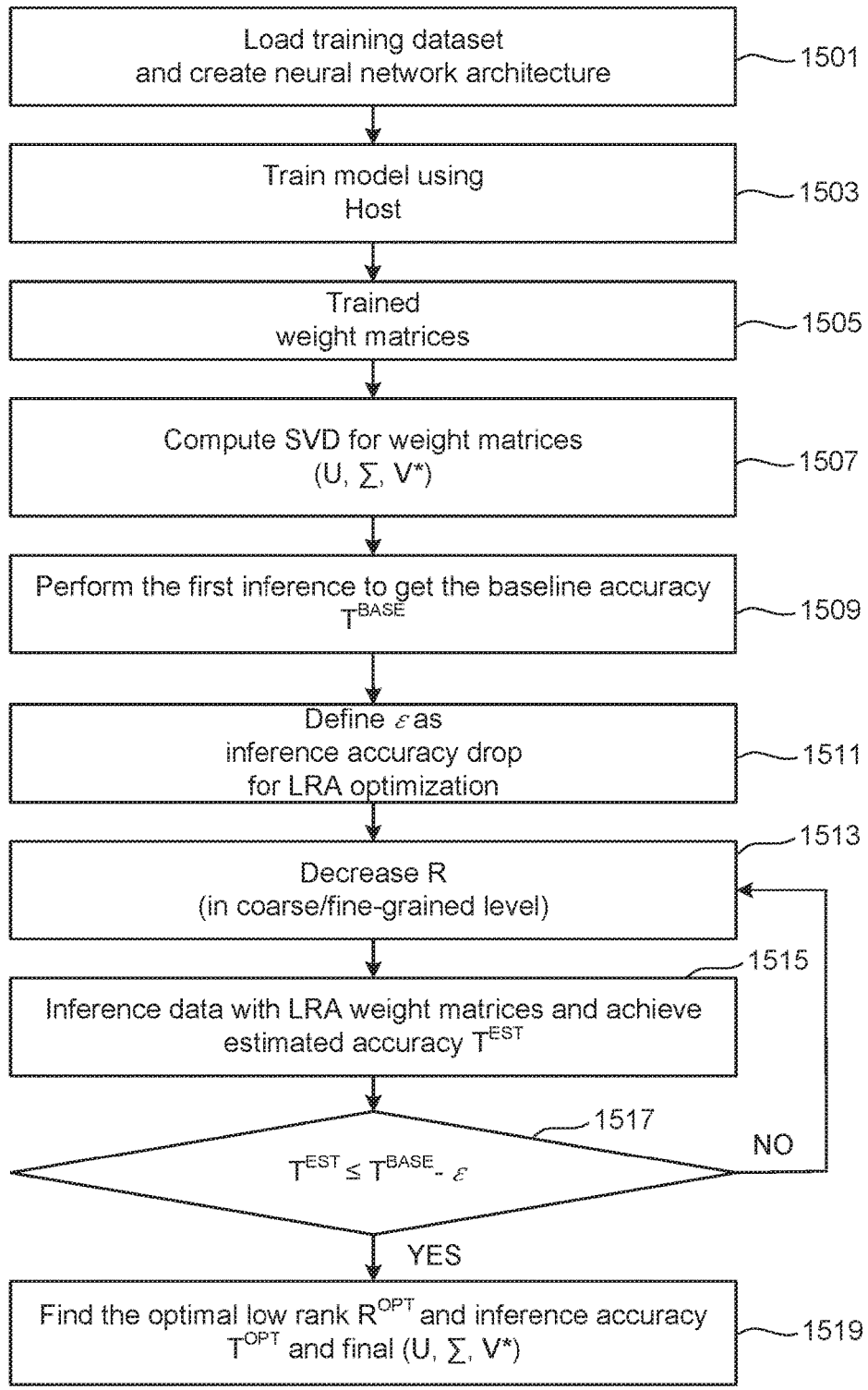
FIG. 15 is a flowchart for an embodiment for performing offline training to optimize model size for inference using LRA.

FIG. 15 is a flowchart for an embodiment for performing offline training to optimize model size for inference using LRA. The training can be performed by a host that can be CPU, GPU, or ASIC accelerator, for example. After an initial training as described above with respect to FIG. 9A, for example the LRA process follows. The target of the LRA segment of training is to obtain the optimal (lowest) rank $R^{OPT}$ of singular value decomposition matrices (U, $\Sigma$, V*) and a final inference accuracy $T^{OPT}$ that meet the condition:

$$T^{BASE} - T^{OPT} \geq \varepsilon,$$

where in the above ε is the accuracy drop constraint for inference (in %) when LRA is applied to weight models, $T^{BASE}$ is the inference accuracy of the model without applying LRA, and $T^{OPT}$ is the inference accuracy of the model with the optimal (i.e., lowest) rank $R^{OPT}$.

Beginning in step 1501, a training dataset is loaded on to the training device and a neural network architecture is created. The model is trained in step 1503, where this process can be as described above with respect to FIG. 9A. This results in the trained weight matrices at step 1505. Based on the trained weights from step 1505, the LRA process follows in steps 1507–1519.

At step 1507, a singular value decomposition (SVD) is performed for the weight matrices from step 1505 to obtain the corresponding set of matrices (U, Σ, V*), where this will typically be performed for all of the weight matrices, but could also be performed for just a subset in some cases. Once the decomposition has been performed, but before LRA optimization, at step 1509 a first inference based on this decomposition is performed to get the baseline accuracy $T^{BASE}$.

Once the baseline accuracy is established, step 1511 defines a value for ε, the accuracy drop constraint for inference, to be used for the LRA optimization. Starting from the original rank R of the matrices from step 1507, R is decreased in step 1513, where this can be done in a coarse to fine grained level as the flow loops back from step 1517. With the decreased R value of step 1513, an inference for the test data using the LRA matrices is performed and a corresponding estimated accuracy $T^{EST}$ determined at step 1515. Step 1517 checks whether the estimated accuracy meets accuracy criterion, $T^{EST} \leq T^{BASE} - \varepsilon$. If not, the flow loops back to step 1513. If the condition at step 1517 is met, in step 1519 the optimal low rank $R^{OPT}$, inference accuracy $T^{OPT}$, and set of matrices (U, Σ, V*) are determined. As discussed below, such as with respect to FIG. 16D, in some embodiments the matrix Σ can be folded into U, V or a combination of these to reduce the decomposition two matrices. Such a compression can be included in step 1519, where in the examples below (U, Σ, V*) is replaced with the pair (U', V*)

Figure 16A:
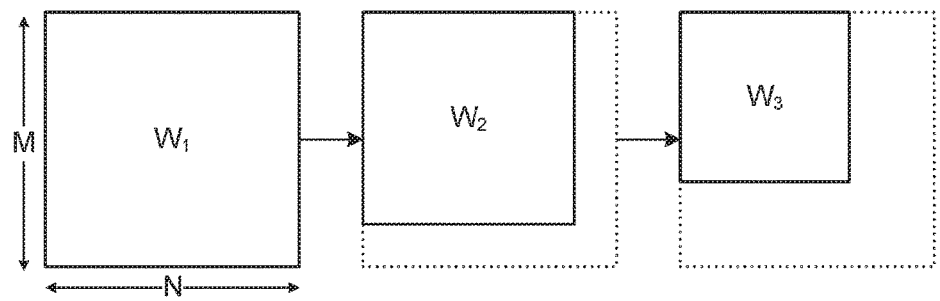
FIGS. 16A and 16B illustrate the mapping of a neural network model into a compute in memory DNN inference engine for a conventional mapping and an LRA-based mapping.
Figure 16B:
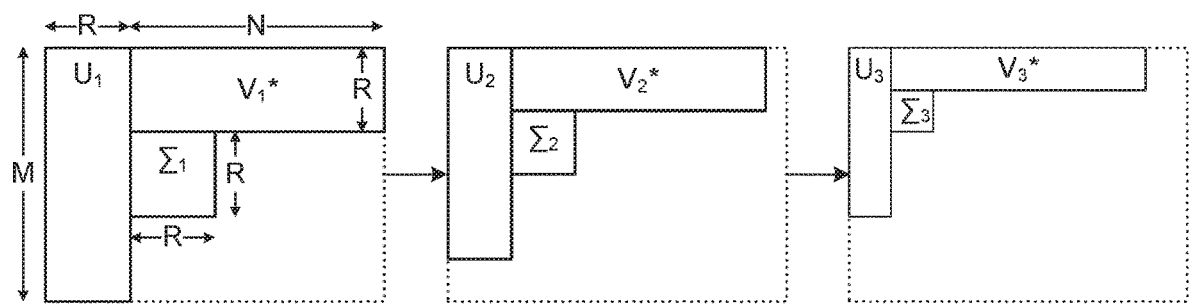

FIGS. 16A and 16B illustrate the mapping of a neural network model into a compute in memory DNN inference engine for a conventional mapping and an LRA-based mapping. In both cases, three layers are shown mapped to memory arrays for pipelined processing, where throughput can be maximized by mapping one layer to a single memory array for pipeline processing, although several arrays can be used for a layer if it does not fit into a single array. In each of FIGS. 16A and 16B, three layers are shown. In the conventional mapping, the originally determined pre-LRA weights (i.e., at the end of step 1505) $W_1$, $W_2$, $W_3$ are each mapped into a corresponding array, with $W_1$ of size M×N and each subsequent weight matrix decreasing in size.

FIG. 16B illustrates LRA-based mapping of the three weights, with each W decomposed into a set of matrices ($U_i$, $\Sigma_i$, $V_i^*$), with each set then again stored in a single array and can be arranged in the arrays as illustrated. The $W_1$ array is replaced by the M×R $U_1$ array, the R×R $\Sigma_i$ array, and the R×M $V_1^*$ array. The single multiply-accumulate operation for $W_1$ is then replaced with three such operations for $U_1$, $\Sigma 1$, and $V_1^*$, all performed within the same array. The sizes of the decomposition matrices ($U_2$, $\Sigma_2$, $V_2^*$) and ($U_3$, $\Sigma_3$, $V_3^*$) successively decrease at each layer.

Figure 17A:
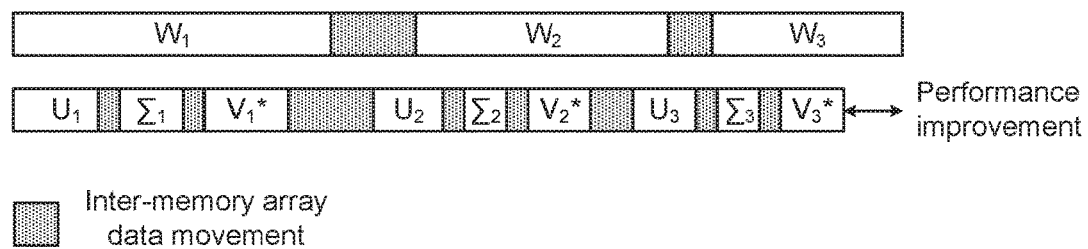
FIGS. 17A and 17B respectively compare the relative amount of times for the three and two matrix decomposition data computation and movement for a conventional mapping and an LRA-based mapping.

FIG. 17A compares the relative amount of time for the three data computations and movements for a conventional mapping at top and an LRA-based mapping at bottom. For the conventional mapping, after the $W_1$ multiply-accumulate operation an inter-memory array data movement moves the data over to the array holding $W_2$ for the second layer's multiply-accumulate, after which another inter-memory array data movement is made to the array holding $W_3$ for a third multiply-accumulate. For the decomposition matrices (U, Σ, V*) of each layer in the LRA-based mapping, the single multiply-accumulate of the layer is replaced by three multiply-accumulate operations and two intra-array data movements (between the U and multiply-accumulates and between the Σ and V* multiply-accumulates), followed by the inter-array data movement to the next layer. As illustrated in FIG. 17A, on the one hand the LRA-based mapping might incur performance overhead due to introducing extra data movement between the computations using the decomposition matrices (U, Σ, V*). On the other hand, more importantly, the LRA-based can significantly reduce the computation time (greater than the overhead) by achieving low rank R value (smaller size, sparser decomposition matrices). As the result, their cumulative time is still less that the conventional mapping, resulting in the illustrated performance improvement. (It will be understood that FIG. 17A is schematic, but the relative durations are typical for a representative model.)

The LRA-based implementation can provide a number of advantages when implementing DNNs. As the matrix multiplications are computed with smaller sized matrices for the singular value decomposition matrices, this leads to a reduction in memory access, thus improving both performance and energy efficiency of compute in memory DNN inference engines. The LRA-based approach uses fewer mapped weight values, requiring the programming and reading of fewer cells. Additionally, when implemented in a binary or low-precision computation, many of these cells can be programmed to an off-state for further power savings. Further, as can be seen from the representation in FIG. 16B, the LRA-based mapping allows for the programming of the U, Σ, or V* matrices to skip a number of unnecessary bit lines and word lines, with resultant power savings.

In some circumstances, the conventional mapping can offer advantages. For example, in an implementation in which all bit lines and all word lines can be active concurrently, the conventional approach can compute each of the $W_1$-$W_3$ matrices in 1 cycle, where the LRA-based approach will use at least 3 cycles to compute the multiplications of the U, Σ, and V* matrices. However, the "all bit lines, all word lines at once" design for a conventional mapping compute in memory DNN can have drawbacks. For example, the concurrent activation of such a large number of bit lines and word lines can exceed the power budget of a memory chip. Additionally, being able to read out all bit lines concurrently requires a large number of analog to digital conversion (ADC) circuits, and sample and hold circuits, which are dominant portions of the total power consumption and the area of a chip. In many applications, the LRA-based approach presents a more practical design of a compute in memory DNN inference engine by balancing the parallelism and constrains for ADCs, where multiple word lines can be activated in parallel, but for only a single bit line, thus allowing multiple bit lines to share a single ADC. The trade-offs between inference accuracy and high performance and energy efficiency (or HPEE) is described further with respect to FIGS. 18-21.

The data as laid out in FIG. 16B is functional, but, as can be seen, much of the array area is not used. In an alternate set of embodiments, a more efficient lay-out can place the matrices U and V out in dedicated subarrays that are closer to their size. Furthermore, being diagonal the Σ can be compressed down to a single vector 6, and which can either be applied as a scalar multiplication, or be folded into either U or V as a normalization factor.

Figures 16C, 16D:
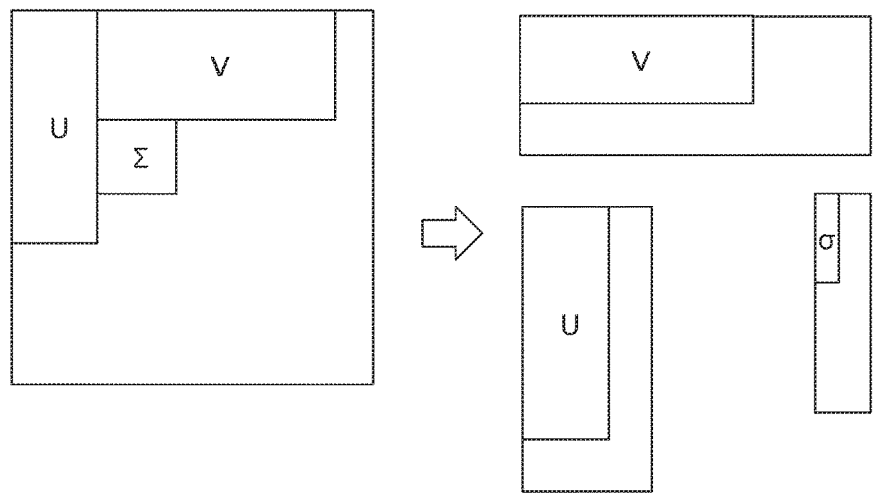
FIG. 16C illustrates the storing of the different matrices of a singular value decomposition in different arrays.
FIG. 16D represents matrices of a singular value decomposition before and after reducing the number of matrices.

FIG. 16C illustrate the storage of the decomposition matrices/vector U, σ, and V each in its own array (to the right), rather than in a shared array as on the left. In a custom array design, these separate U, Σ, and V matrices can be sized based on the largest expected size for each of these matrices/vectors, resulting in less wasted area than when all three parts of a decomposition are stored in a share array as shown at left in FIG. 16C.

The amount of storage, and number of operations required for the in-memory inference for a set of decomposition matrices can be further reduced by folding the diagonal matrix Σ (or, equivalently, vector representation σ) into either U or V. For example, depending on the embodiment, the Σ matrix could be combined with U as U'=U Σ, with V as V'*=ΣV*, or factored (such as $[(\Sigma)^{1/2} \cdot (\Sigma)^{1/2}]$) split between U and V*.

FIG. 16D shows an example of an M×R matrix U and an R×R matrix Σ, along with their product the M×R matrix U'. This folding of the matrix Σ into matrix U can done subsequent to determining U, Σ, and V, and before programming the matrices into the memory. In other embodiments, Σ can be combined with V* or split between U and V*, but the following considers the case when Σ is combined with U. FIG. 16D shows both the original decomposition matrices U and Σ, and their product U'.

Figure 16E:
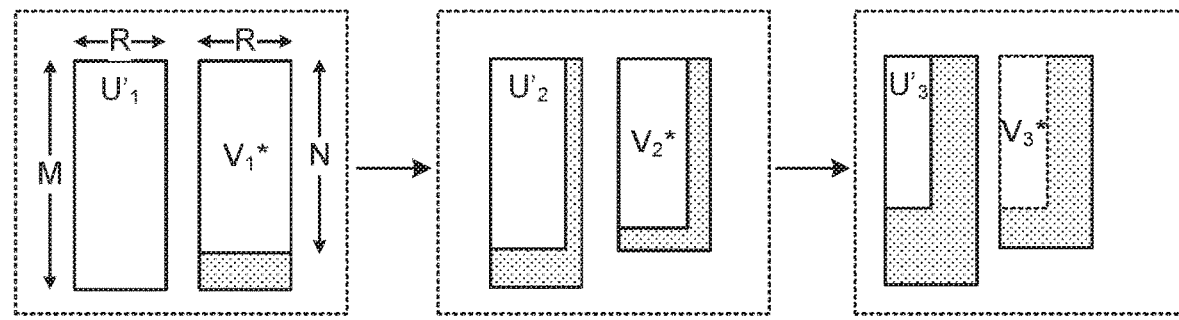
FIG. 16E corresponds to FIG. 16B, but with the number of matrices in the decomposition reduced.

FIG. 16E corresponds to FIG. 16B, but where the matrices U and Σ are replaced with the matrix U', and each of U' and V* is stored on separate arrays. The arrays for each of the U' and V* matrices can be based on the largest U' and V* values. Relative to FIG. 16B, each layer's decomposition now is two matrices, rather than three, so that the number of in-array multiplications for each weight is now two rather than three. Also, each of the U' and V* matrices are stored in a relatively smaller array, saving on area for the memory array.

Figure 17B:
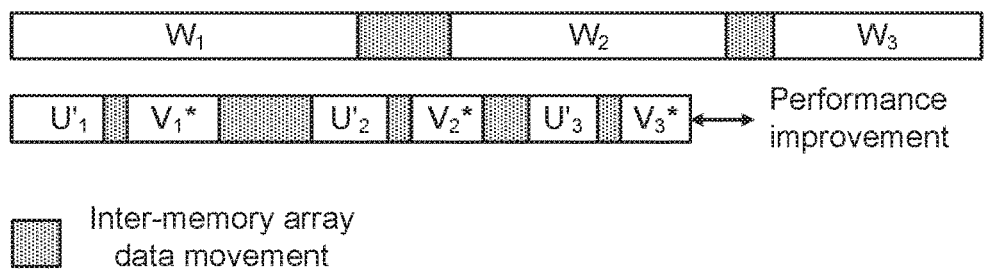

FIG. 17B corresponds to FIG. 17A, but for an embodiment such as FIG. 16E where the decomposition is reduced from three matrices per layer to two matrices per layer. As the number of in-array multiplications is reduced by a factor of ⅔ due to the compression of, in the example of FIGS. 16D and 16E, the matrices U and Σ are compressed into the matrix U'. The compression to eliminate the Σ matrix can be performed as part of the training processes. Once the U and Σ matrices are computed, the compressed U' can be determined before the weights are written into the memory arrays.

Figure 18:
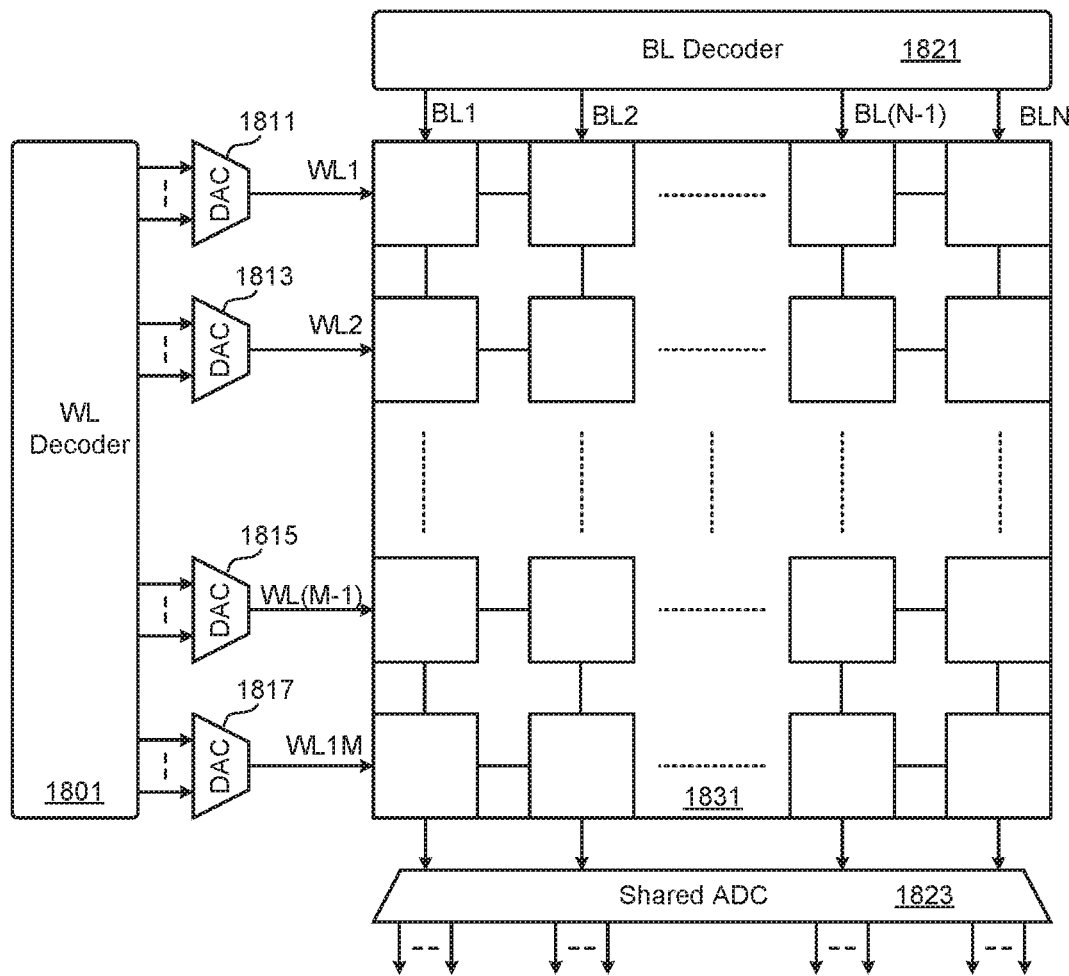
FIGS. 18, 19A, and 20A respectively illustrate a conventional compute in memory DNN inference engine, an LRA-based compute in memory engine using matrices of optimized rank, and an LRA-based compute in memory engine using matrices of reduced rank.
Figure 19A:
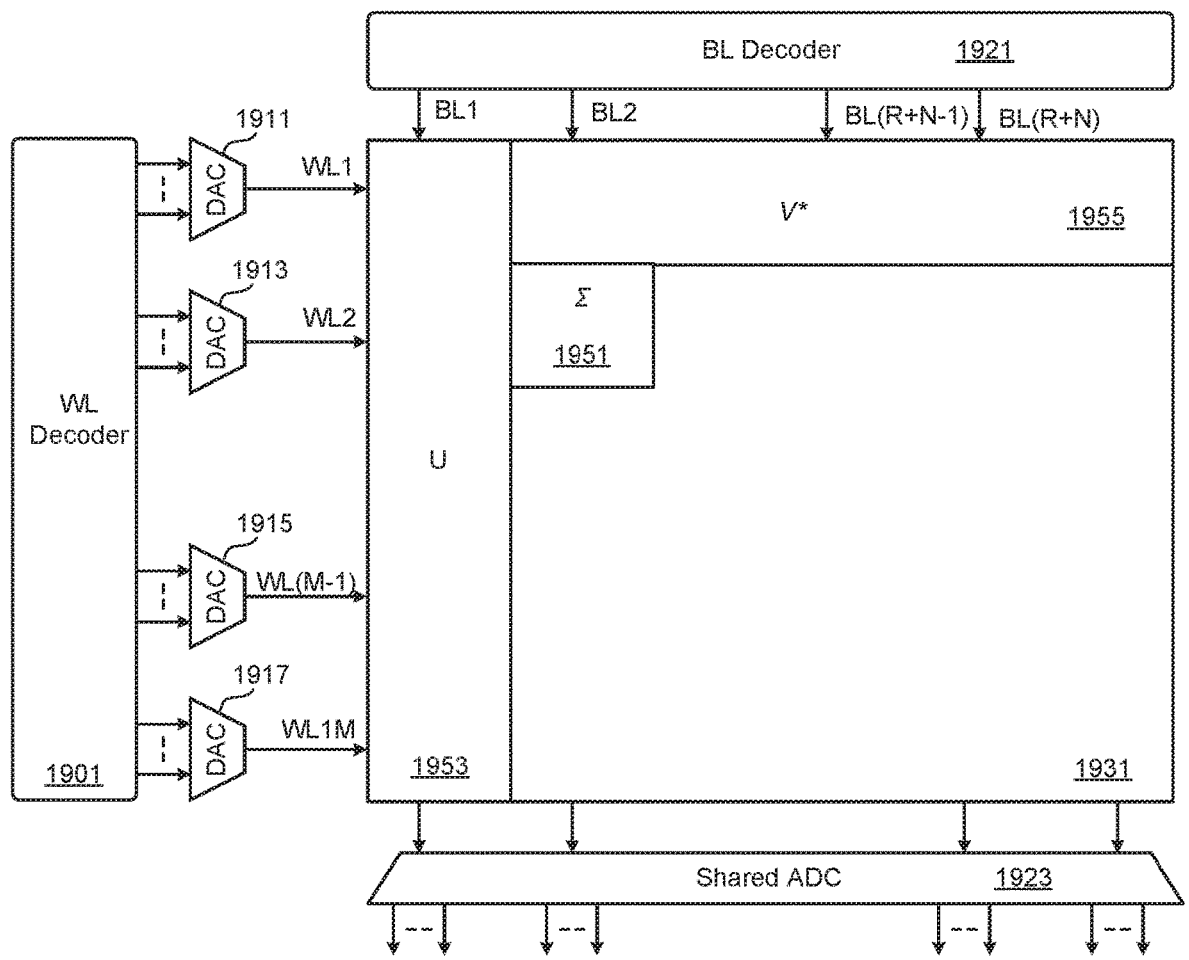
Figure 19B:
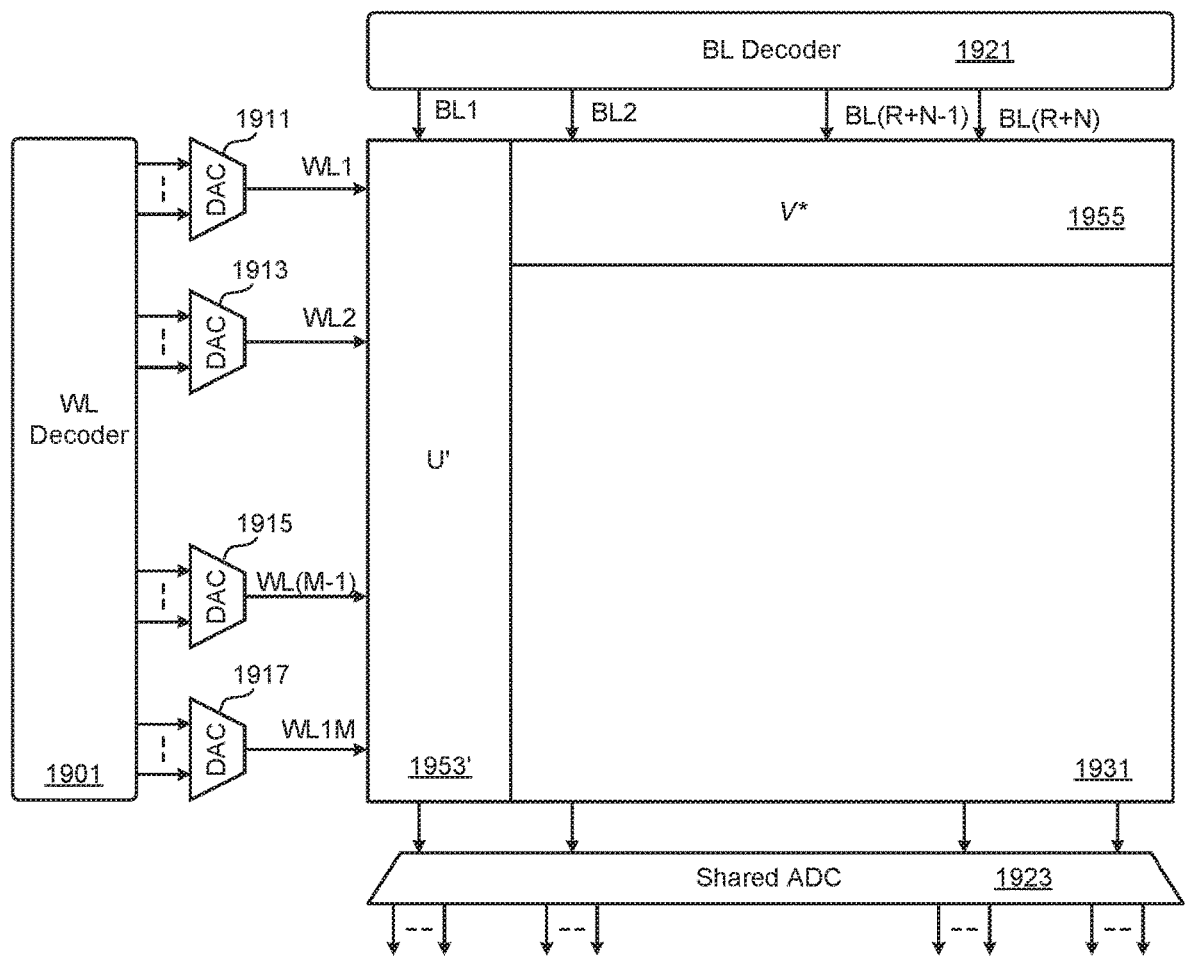
FIGS. 19B and 20B respectively correspond to FIGS. 19A and 20A when the three matrix decomposition is replaced a two matrix decomposition.
Figures 20A, 21A:
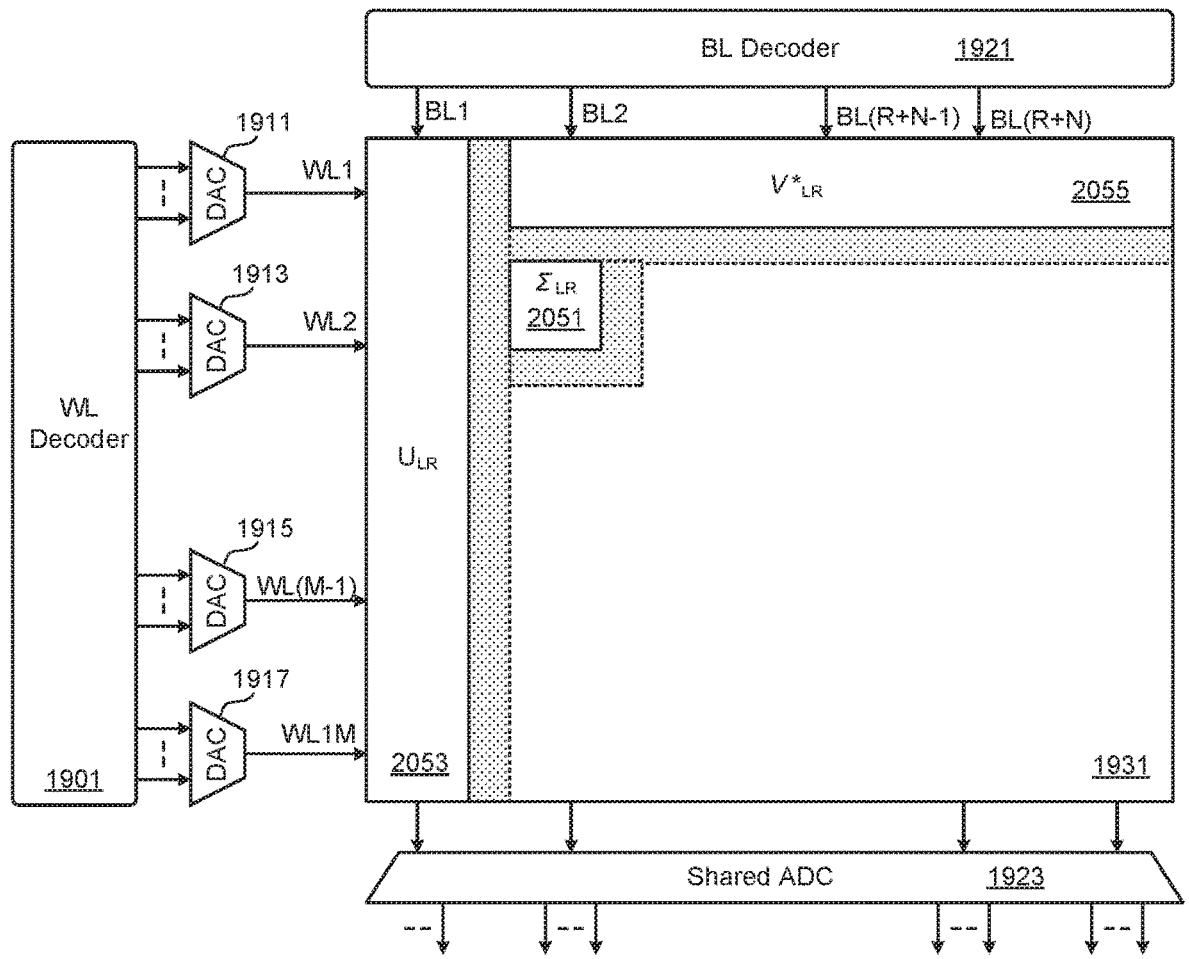
FIGS. 21A and 21B are tables to compare the relative number of multiply-accumulate operations or memory accesses of the different approaches.
Figures 20B, 21B:
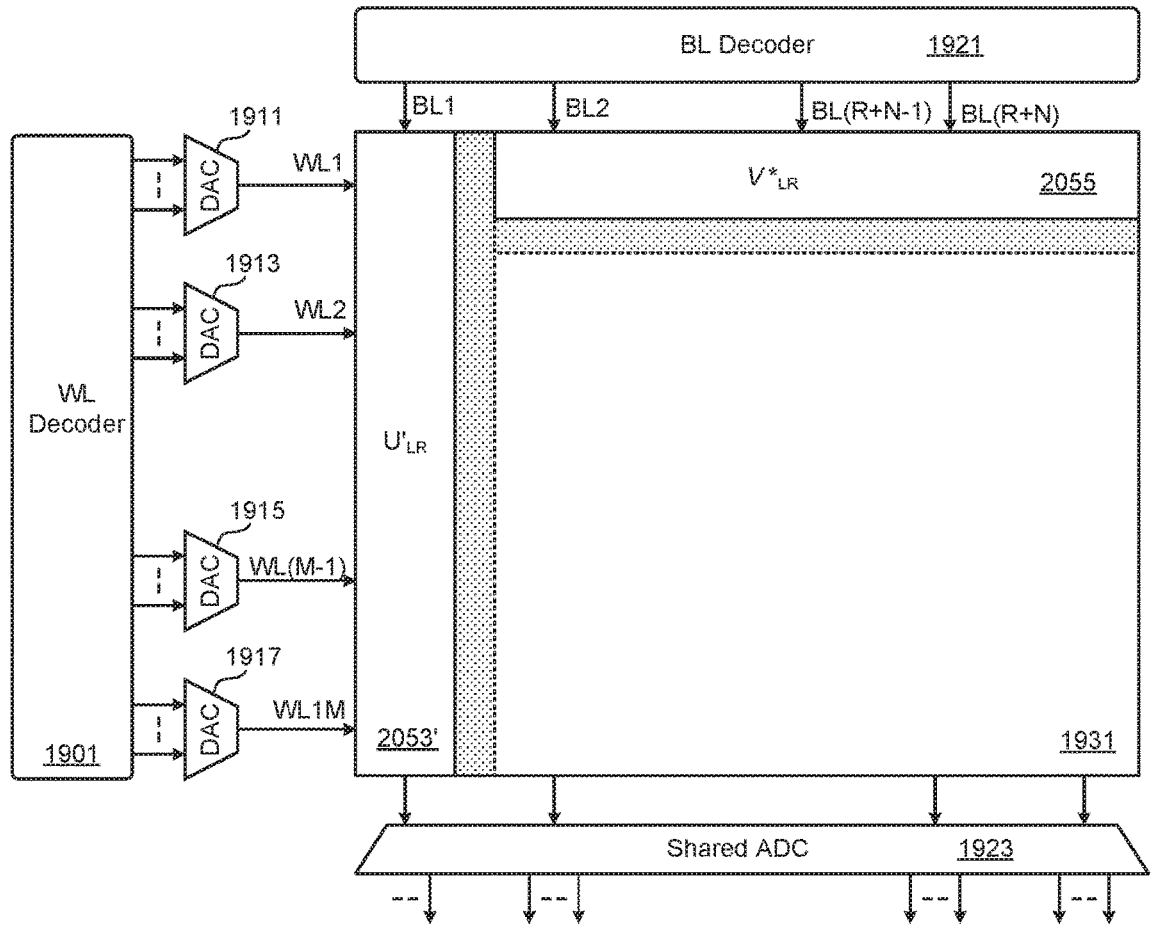

FIGS. 18, 19A, and 20A respectively illustrate a conventional compute in memory DNN inference engine, an LRA-based compute in memory engine using matrices of rank $R^{OPT}$ (or "OPT mode"), and an LRA-based compute in memory engine using matrices of reduced rank $R^{REQ}$ (or "HPEE mode"). FIGS. 19B and 20B correspond to FIGS. 19A and 20A, but when the Σ matrix is folded into the U matrix as U'. FIGS. 21A and 21B are tables to compare the relative number of multiply-accumulate operations (#MACs) or memory accesses of the different approaches in the three matrix decomposition and the two matrix decomposition, respectively.

FIG. 18 illustrates conventional compute in memory DNN inference engine, where, as used in this context in this document, "conventional" refers to the use of weight values as obtained by a training process at step 1505 of FIG. 15, prior to their singular value decomposition and LRA process. Each of the weight values can be stored in a memory cell of an SCM memory array 1831 with memory cells formed according to a ReRAM, MRAM, PCM or other memory technology. For a M×N weight matrix, the weight values can be stored along the memory cells connected along word lines WL1-WLM and bit lines BL1-BLN. Depending on the embodiment, each of the weights can be stored as multi-state data in a multi-level cell (MLC) format or as binary data in a single-level cell (SLC) format. If the weight values are encoded as conductance (inverse resistance) values $G_w$ (=$1/R_w$) and inputs are encoded as voltage values $V_{in}$ on the corresponding word line, the result of the multiplication is the product of these two values as reflected by the output current on the corresponding bit line: $I_{out}=V_{in}G_w$.

The voltages representing the input values applied to the word lines by control circuitry as represented by the word line decoder 1801 that supplies the digital input values to the digital to analog converters DAC 1811, DAC 1813, ..., DAC 1815, DAC 1817 that are each connected to drive a corresponding word line of the array 1831. The word line decoder 1801 and DACs 1811-1817 can be taken as part of the one or more control circuits used to perform an in-array inferencing operation and can corresponding to the row decoder 324 and other control circuits 310 of FIGS. 5 and 6A.

The bit lines BL1-BLN of FIG. 18 are connected between a bit line decoder 1821 and a shared analog to digital converter (ADC) 1823. The bit line decoder 1821 can activate selected bit lines, and the ADC 1823 converts the analog current on the bit lines to a digital output value. The bit line decoder 1821 and the ADC 1823 can be implemented as part of the one or more control circuits used to perform an in-array inferencing operation and can corresponding to the read/write circuits 328, column decoder 332 and other control circuits 310 of FIGS. 5 and 6A.

FIG. 19A illustrates an LRA based compute in memory DNN where the descending diagonal matrix of the singular value decomposition has a rank $R^{OPT}$, where this corresponds to the rank as determined at step 1519 of FIG. 15. The array 1931 and other shown elements of FIG. 19A can correspond to the array 1831 and other similarly numbered elements shown in FIG. 18 (i.e., 1901 can correspond to 1801, and so on). Rather than store the conventional weight matrix as in the embodiment of FIG. 18, the singular value decomposition matrices U, Σ, and V* are now stored in the memory array 1931, where one embodiment of an arrangement for doing this is shown in FIG. 19A. More specifically, as shown in FIG. 19A, U 1953 is stored along word lines WL0-WLM and bit lines BL1-BLR, 1951 is stored in the memory cells connected on the R word lines WL(R+1)-WL(2R) and R bit lines BL(R+1)-BL(2R), and V* 1955 is stored in the memory cells along word lines WL1-WLR and bit lines BL(R+1)-BL(R+M). As discussed above, Σ is diagonal and consequently only has one entry for each word line and each bit line of its portion of the array. To perform an inference for the embodiment of FIG. 19A, the same input values as applied for FIG. 18 is applied to the matrix U 1953 to generate a first intermediate value for the layer, which then serves as input to Σ 1951 to generate a second intermediate value for the layer. The second intermediate value for the layer is then input into the matrix V* 1955 to generate the output for the layer.

The decomposition matrices U, Σ, and V* of FIG. 19A are for the rank IV' as determined at step 1519 of FIG. 15, corresponding to an optimized LRA process. As Σ is a descending diagonal matrix, so that the values along the diagonal become smaller and smaller progressing down the diagonal. As such, these later diagonal values contribute less to the inference result than the earlier values. Consequently, by using a lower rank portion of $\Sigma$, the number of memory accesses in the inference can be reduced, but at the cost of inference accuracy. In the following, such a reduced activation will be referred to as a High Performance and Energy Efficient, or HPEE, embodiment, as the reduction in the number of memory accesses increases both performance and energy efficiency. The lower rank portion of is $R^{REQ}<R^{OPT}$, where the amount by which the rank can be reduced is a trade-off between inference accuracy and performance/energy efficiency. In the embodiment presented in FIG. 20A, the decomposition matrices U, $\Sigma$, and V* corresponding to the optimized process of FIG. 15 with rank $R^{OPT}$ are again stored in the array 1931; however, rather than use the full rank of these elements, the reduced rank $R^{REQ}$ of the HPEE mode are used. The determination of $R^{REQ}$ can be performed from in-memory operations using the decomposition matrices U, $\Sigma$, and V*, as described further with respect to FIGS. 22 and 23.

FIG. 19B corresponds to FIG. 19A, but when the U and matrices are compressed into the matrix U'=U*$\Sigma$. An in-array inference operation can proceed largely as described with respect to FIG. 19A, but now the intermediate output from the U' matrix is the input applied to the V* matrix to generate the output, rather than performing the middle in-array multiplication based on the $\Sigma$ matrix. For comparison, in FIG. 19B and FIG. 20B below, both of the U' and the V* matrices are stored in the same array as in FIGS. 19A and 20A, rather than separate arrays as illustrated in FIG. 16E. FIG. 19B is numbered as in FIG. 19A, but now the matrix U 1953 is replaced with U' 1953' and the $\Sigma$ matrix from FIG. 19A is gone, as $\Sigma$ is folded into U' 1953'.

FIG. 20A illustrates an LRA-based compute in memory DNN inference operation in HPEE mode using rank $R^{REQ}$. FIG. 20 repeats the elements of FIG. 19, except the decomposition matrices U, $\Sigma$, and V* are now represented as the corresponding reduced rank portions $U_{LR}$ 2053 of size M×$R^{REQ}$, $\Sigma_{LR}$ 2051 of size $R^{REQ}$×$R^{REQ}$, and V*$_{LR}$ 2055 $R^{REQ}$×N, along a shaded portion of each. In HPEE mode, in an inference operation the bit lines corresponding to the shaded regions are not activated, the word lines corresponding the shaded word lines are not biased with an input voltage, or both, thus significantly reducing the number memory accesses.

FIG. 20B is the compressed version of FIG. 20A, where the $U_{LR}$ 2053 and $\Sigma_{LR}$ 2051 matrices of FIG. 20A are folded in the matrix U'$_{LR}$ 2053'. In HPEE mode, FIG. 20B operates similarly to the embodiment of FIG. 20A, except that now the intermediate output from the in-array multiplication using U'$_{LR}$ 2053' is used as input to V*$_{LR}$ 2055. The rank can be similarly reduced, but the number of in-array multiplications for the layer is now two rather than three.

Considering the embodiments of FIGS. 18-20B, the compute in memory DNN baseline architecture, in some embodiments supports programming of multiple word lines in parallel, but with only a single bit line read-out (a row-orientation), thus accelerating matrix multiplication. The different embodiments can be used in different operational scenarios, where when the system wants to run in a limited power condition or with higher speed, the system can shift from the optimized mode of FIGS. 19A and 20A to run into the HPEE mode of FIGS. 20A and 20B with a limited accuracy drop.

FIG. 21A is a table comparing the performance of these different architectures, looking at the number of multiply-accumulate operations (i.e., number of memory accesses) for the conventional arrangement of FIG. 18, the optimized LRA-based implementation, and when the DNN inference engine is configured to run matrix multiplication in HPEE mode with matrices of rank $R^{REQ}$ that is less than the optical rank of $R^{OPT}$ as determined by training as in FIG. 15. In the table of FIG. 21A, a memory access (equivalent to a single multiple accumulate) consists of one activated bit line and one programmed word line by input data from the host or previous layer. For the conventional embodiment, the number of memory accesses is C*M*N, while the for the optimized LRA embodiment this is reduced to C*$R^{OPT}$(M+N+1), as discussed above with respect to FIG. 14. In the LRA-based HPEE mode, this is further reduced to C*$R^{REQ}$(M+N+1). Though in some embodiments the compute in memory DNN inference engines can execute multiple memory accesses in parallel, the performance and energy efficiency of an inference operation is relatively proportional to the number of memory accesses.

FIG. 21B is a table similar to FIG. 21A, but for the embodiments where the matrix is folded into one or both of U and V. Relative to FIG. 21A, as the matrix is folded into U and/or V*, in both the OPT and HPEE modes the number of accessed are reduced, with the (M+N+1) of FIG. 21A reduced to (M+N), for C*$R^{OPT}$(M+N) and C*$R^{REQ}$(M+N+1).

Figure 22:
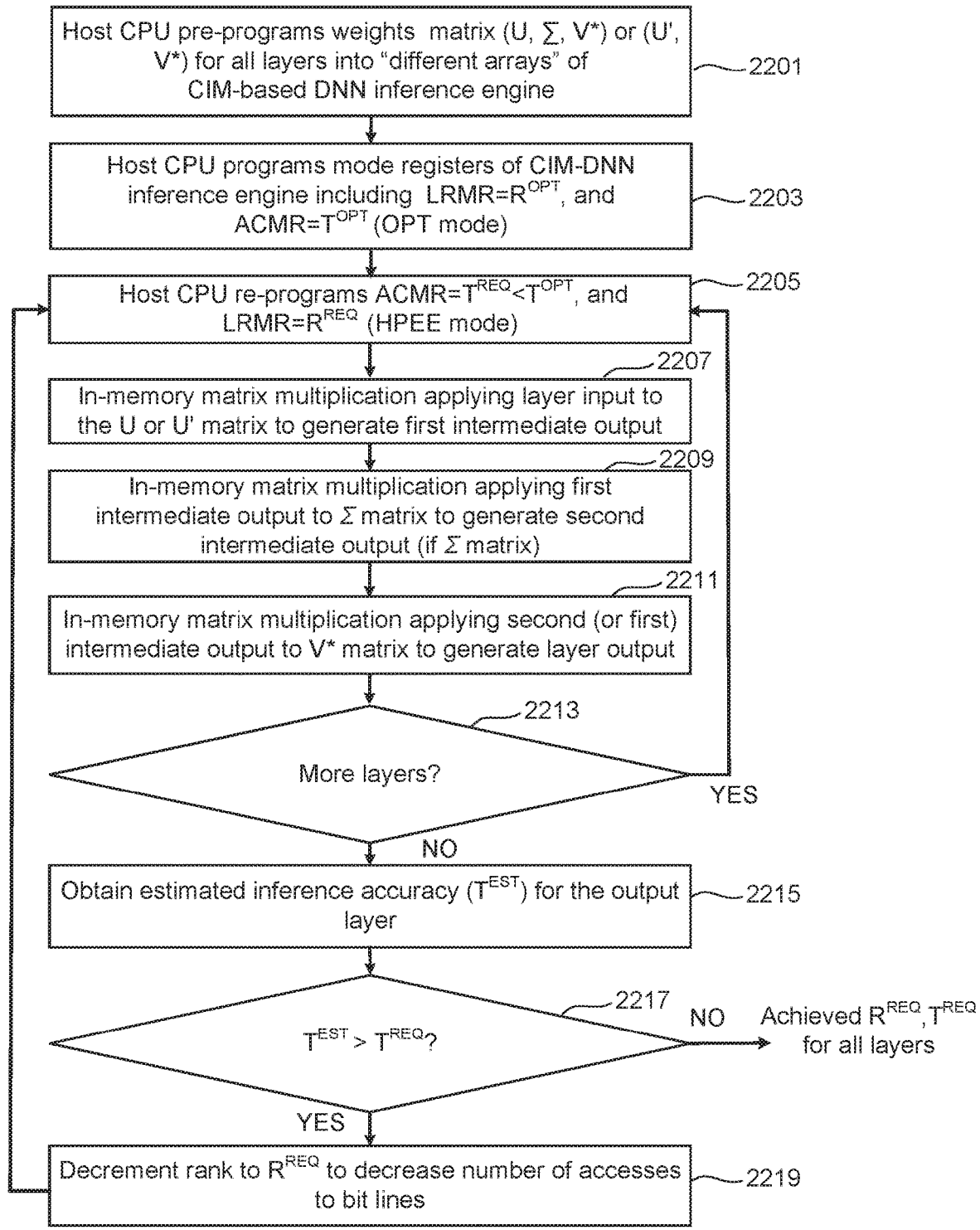
FIGS. 22 and 23 are flowcharts for embodiments for LRA-based compute in memory DNN inference engines in high performance and energy efficiency mode for respectively optimizing the rank for all fully connected layers and for optimizing the rank of individual fully connected layers.
Figure 23:
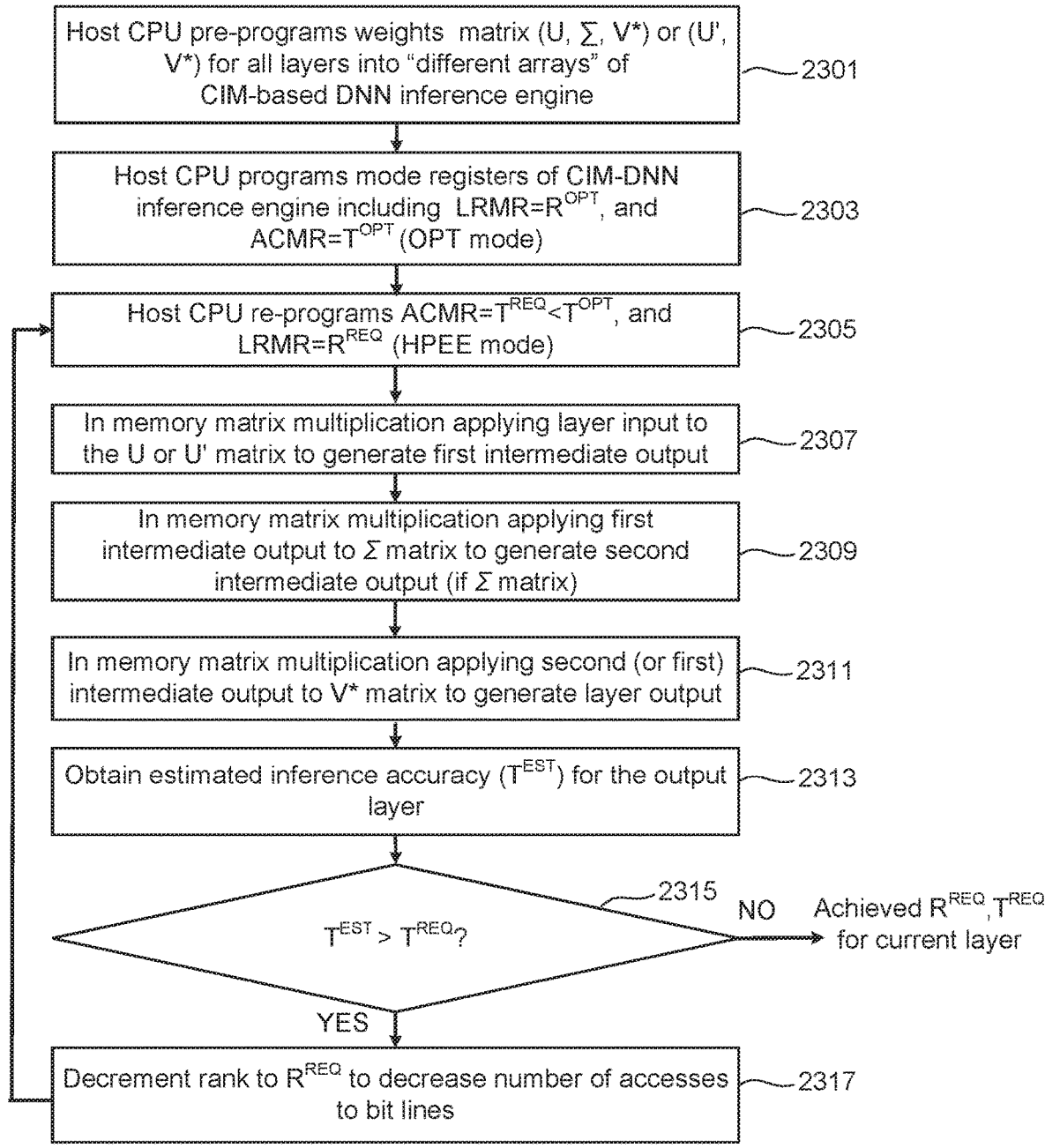

FIGS. 22 and 23 are flowcharts of embodiments for LRA-based compute in memory DNN inference engines in HPEE mode for respectively optimizing the rank for all fully connected layers and for optimizing the rank of individual fully connected layers. This can be considered an additional, in-memory phase of training to determine the reduced rank value $R^{REQ}$. Beginning at step 2201 of FIG. 22, a host CPU can pre-program the singular value decomposition matrices (U, $\Sigma$, V*) or (if is combined with U, for example) (U', V*) for the layer into the different arrays of the compute in memory based DNN inference engine. For purposes of discussion, the following flows are mainly described in the context where (U, $\Sigma$, V*) or (U', V*) stored in the same array, but it will be understood that these can each be stored in separated arrays, for example. Also, the (U, $\Sigma$, V*) will often be taken as the default representation for discussion as it is often easier to visualize, but it will also be understood that the discussion extends to two matrix compressions such as (U', V*).

The weight values can be determined as described above with respect to the training of FIG. 15. In the discussion here, each set (U, $\Sigma$, V*) or (U', V*) is presented as written in to a different SCM array, but more generally, depending on array sizes and matrix sizes, more than one set of matrices can be written into a common array or the set of matrices can be written into multiple arrays. The programming of these weight values can be performed by the one or more control circuits described above with respect to FIGS. 5 and 6A, including word line drivers and other biasing circuitry within the row decoder 324 and the read/write circuits 328 under supervision of state machine 312 and other elements of the on-chip control circuitry 310. In step 2203, a host CPU can program mode registers of the compute in memory DNN inference engine, including a low rank mode register (LRMR) storing $R^{OPT}$ and an accuracy mode register (ACMR) storing $R^{OPT}$, such in the mode registers 313 of FIGS. 5 and 6A.

Steps 2205, 2207, 2209, 2211, and 2213 form an inner loop to obtain an estimated accuracy for the HPEE mode. In step 2205 the host CPU can reprogram the ACMRs to an accuracy value of $T^{REQ}<T^{OPT}$ and reprogram the LRMRs to $R^{REQ}$. Step 2207 executes a compute in memory matrix multiplication operation, applying the layer's input to the U matrix to generate a first intermediate value for the layer. The first intermediate value that is the output of step 2207 then servers as the input to the matrix Σ at step 2209 to generate a second intermediate value for the layer if the (U, Σ, V*) composition is used, while step 2209 is skipped for the (U', V*) decomposition. When the three matrices (U, Σ, V*) are used, step 2209 generates an intermediate input for V* at step 2211 from the intermediate output from at step 2207. When the two matrices (U', V*) at used, generating an intermediate input for V* at step 2211 is directly using intermediate output from at step 2207, as step 2209 is skipped; or, alternately phrased, determining the second intermediate output is just the same as the first intermediate output in FIGS. 22 and 23 when Σ is not used and ship 2209 skipped.

At step 2211, the second intermediate value (for a (U, Σ, V*) decomposition including step 2209) of the first intermediate value (for a (U', V*) decomposition that skips step 2209) then serves as input to the V* matrix for a compute in memory matrix multiplication to obtain a feature map output for the layer. At each of steps 2207, 2209, and 2211, the compute in memory matrix multiplication can be as described above with respect to FIGS. 19A, 19B, 20A, and 20B, with the inputs being applied to the appropriate word lines by the word line decoders applying the analog voltages corresponding to the inputs along the word lines by DACs 1911-1917 and the resultant current along the activated bit lines converter back to digital values by ADC 1923. The inferencing of steps 2207, 2209, and 2211 can skip the activation of unnecessary bit lines and word lines when the rank of the singular value decomposition matrices $U_{LR}$ 2053/$U'_{LR}$ 2053', $\Sigma_{LR}$ 2051, and $V^*_{LR}$ 2055 are decreased as described above with respect to FIGS. 20A/B.

For the matrices $U_{LR}$ 2053/$U'_{LR}$ 2053' and $\Sigma_{LR}$ 2051 (represented in FIG. 20A/B), the intermediate values from steps 2205 and 2207 will be looped back from ADC 1923 to the DACs 1911-1917 to serve as respective inputs at steps 2207 and 2209. The output at step 2211 from one layer will then serve as input to the subsequent layer at step 2205. The result of steps 2205, 2207, and 2209 correspond to propagating through the set of matrices (U, Σ, V*) for the layer and step 2213 determines whether there are more layers and, if so, the flow loops back to step 2205; if not, the flow moves on to step 2215.

Step 2215 determines an estimated inference accuracy $T^{EST}$ based upon the output of the compute in memory matrix multiplication for the output layer (final fully connected layer) of the DNN. From the $T^{EST}$ value, step 2217 determines whether $T^{EST}>T^{REQ}$ and, if so, the rank is decremented at step 2219 to $R^{REQ}$, where $R^{REQ}<R^{OPT}$, to decrease the number of accesses to bit lines before looping back to step 2205 for the next iteration of steps 2205, 2207, 2209, and 2211. If, instead, $T^{EST} \leq T^{REQ}$, then the values for $R^{REQ}$ and $T^{REQ}$ are achieved and the flow ends.

FIG. 23 is a flowchart similar to FIG. 22, but for an embodiment in which the rank is optimized for the individual fully connected layers of a DNN, rather than a single flow to optimize the rank for all of the fully connected layers. Consequently, many of the steps in FIG. 23 can directly correspond to steps in FIG. 22, with, in one of the embodiments, each of steps 2301, 2303, 2305, 2307, 2309, and 2311 being as described above with respect to steps 2201, 2203, 2205, 2207, 2209, and 2211. Relative to FIG. 22, the equivalent of step 2213 is not included so that, at step 2313 inference accuracy $T^{EST}$ is estimated once the rank of matrices ($U_{LR}$, $\Sigma_{LR}$, $V^*_{LR}$) or ($U'_{LR}$, $V^*_{LR}$) of the currently examined fully connected layer is optimized.

Step 2315 can correspond to step 2217 and determine whether $T^{EST}>T^{REQ}$ and, if so, the rank is decremented at step 2317 to $R^{REQ}$, where $R^{REQ}<R^{OPT}$, to decrease the number of accesses to bit lines before looping back to step 2205 for the next iteration of steps 2205, 2207, 2209, and 2211. If, instead, $T^{EST} \leq T^{REQ}$, then the values for $R^{REQ}$ and $T^{REQ}$ are achieved and the flow ends for the current fully connected layer, after which the process can be repeated for the next (if any) fully connected layer of the DNN.

Relative to the flow of FIG. 22, a drawback of the approach of FIG. 23 is an increase in the time to achieve the optimal points, but the amount accuracy drop relative to FIG. 22 can be lower due to fine-gained adapting of the matrix ranks. As the sizes of the different fully connected layers differ, and the degrees to which these can be optimized for the HPEE mode differ, the layer selection for optimization of an individual layer can be important.

Figure 24:
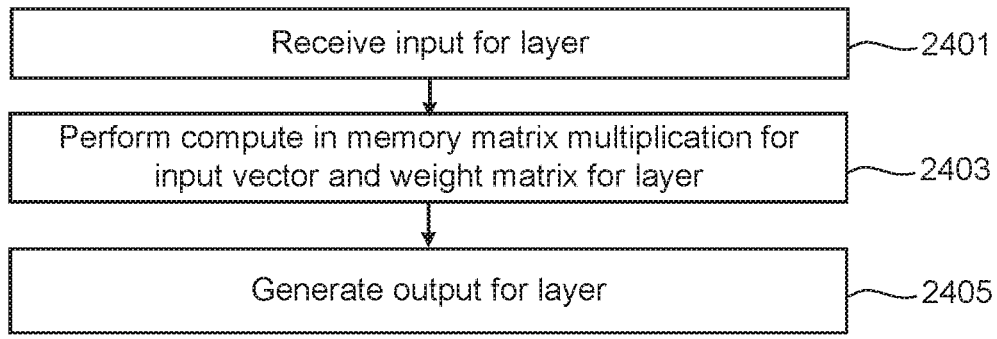
FIGS. 24-26 are high-level flowcharts to illustrate embodiments for performing the inference operations based upon the embodiments of FIGS. 18-20B.
Figure 25:
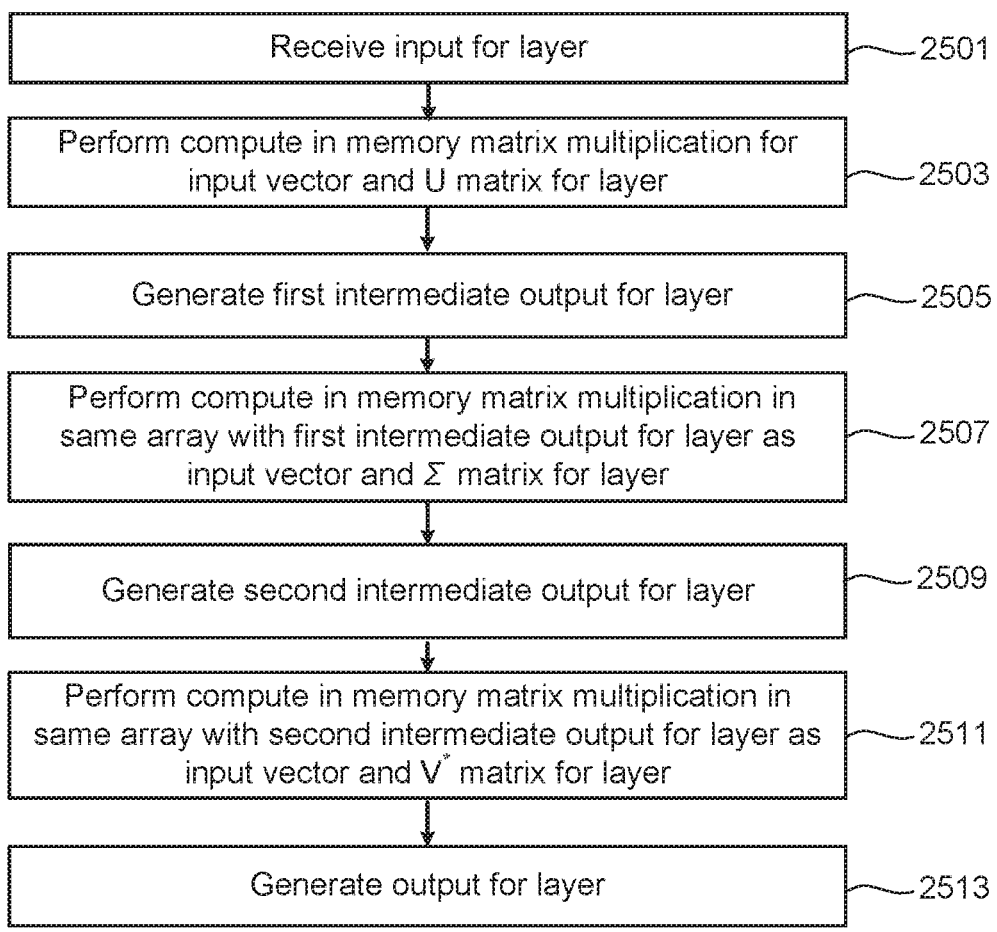
Figure 26:
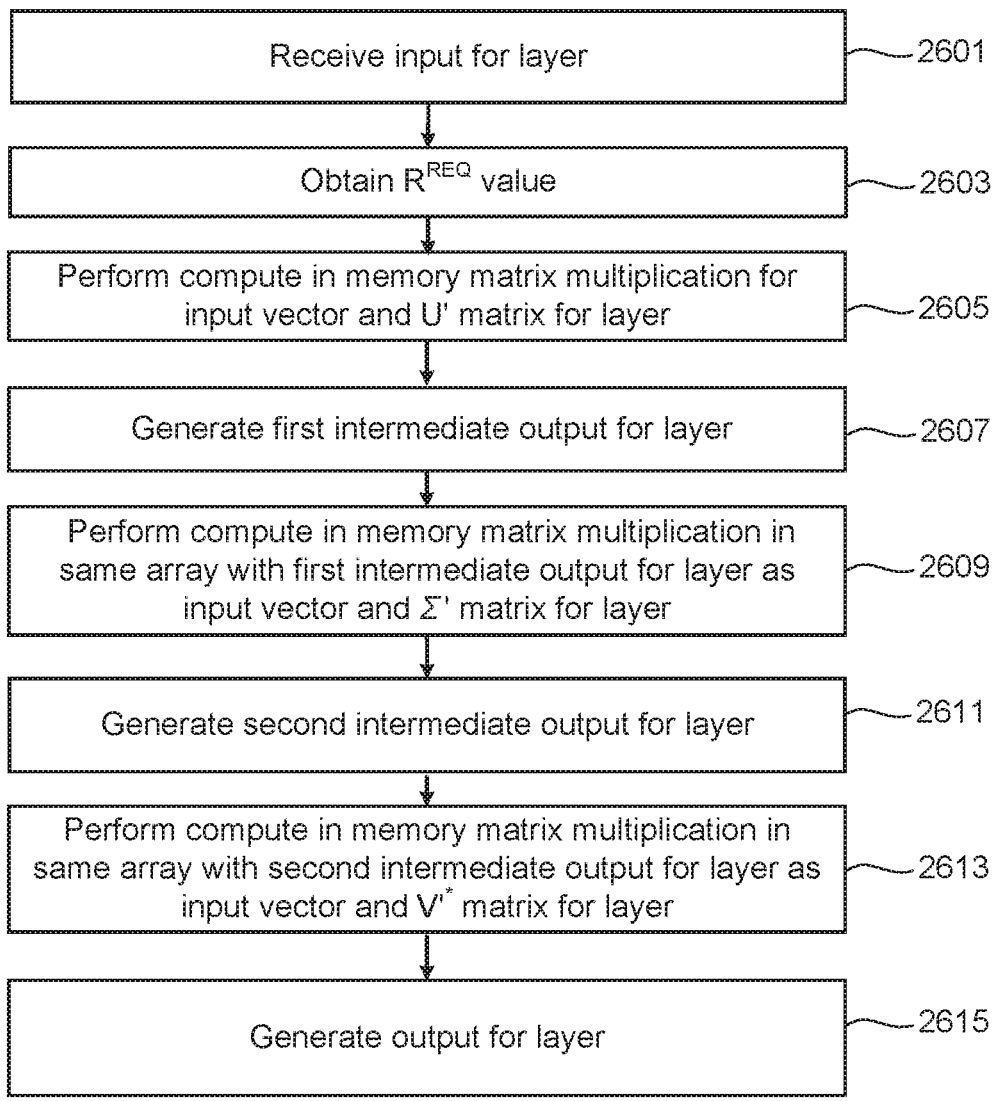
Figure 27:
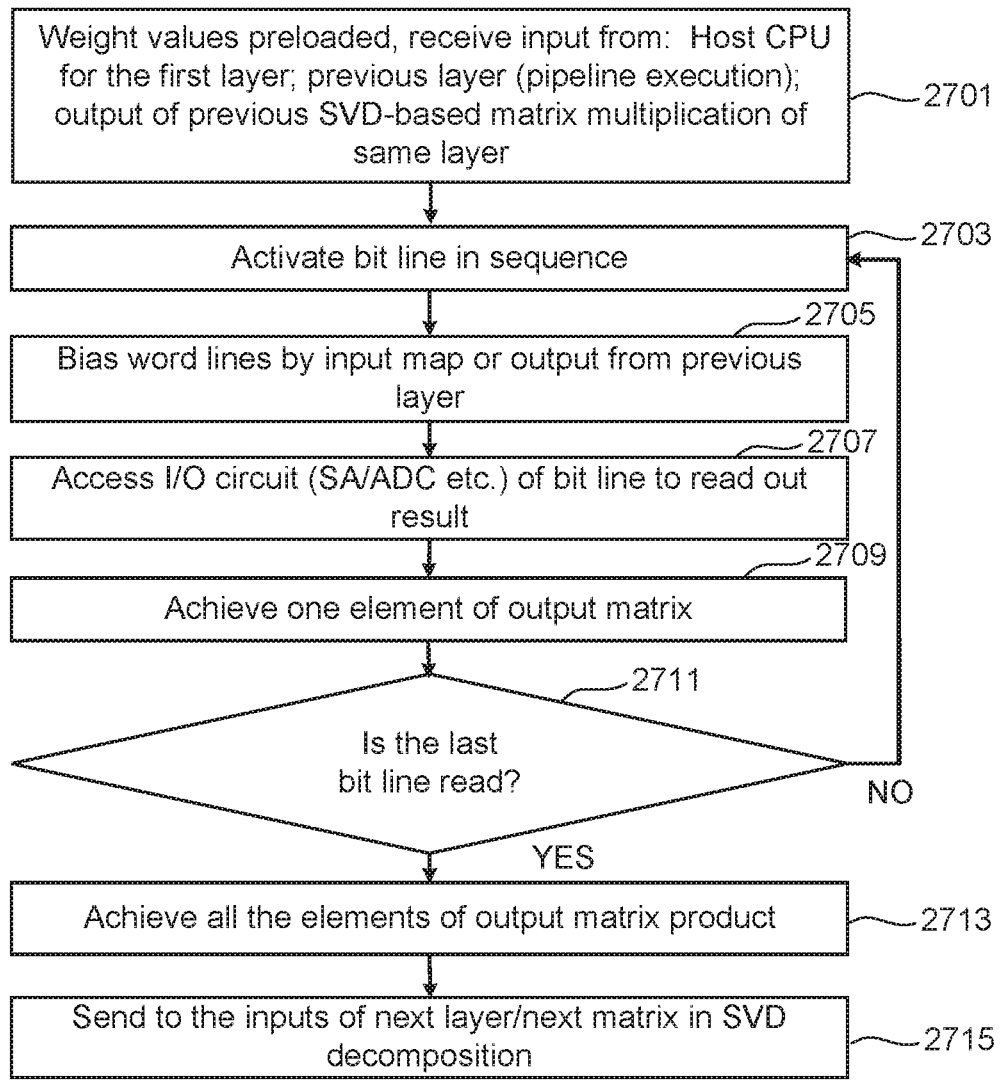
FIG. 27 provides more detail on the individual compute in memory matrix multiplications within each of the flowcharts in FIGS. 24-26.

FIGS. 24-26 are high-level flowcharts to illustrate embodiments for performing the inference operations at each layer of the DNN based upon the embodiments of FIGS. 18-20, with FIG. 27 providing more detail on the individual compute in memory matrix multiplications within each of these flows. In the conventional arrangement of FIG. 18, at each layer the compute in memory matrix multiplication involves only the single weight matrix of the layer. At step 2401 the input for the layer is received, where this can be from a preceding layer or, if the layer is the first, the initial input vector of the DNN. The compute in memory matrix multiplication for input vector and weight matrix for layer is performed at step 2403, generating the output for the layer at step 2405. The output from step 2405 will be the input vector for the next layer, if any, and the final output if the layer is the final one of the DNN.

FIG. 25 is a flow for the inference based on the embodiment of FIG. 19A or 19B, where the conventional weight array for the flow of FIG. 24 is replaced with the corresponding LRA-based singular value decomposition set of matrices (U, Σ, V*) for the layer, where the (U', V*) is performed similarly. At step 2501 the input vector for the layer is received, but this is now applied to the U matrix in step 2503, as opposed to the conventional weight matrix of the flow 24 from which the matrices (U, Σ, V*) are derived. The result of step is a first intermediate output for the layer at step 2505. The first intermediate output from the ADC 1923 is then looped back to the DACs 1911-1917 to serve as input vector at step 2507 for a compute in memory multiplication with the matrix for layer, where, for the embodiment of FIG. 19, this is performed in the same array as step 2503. The in-array operation of step 2507 generates a second intermediate output for the layer at step 2509. The second intermediate output for the layer then serves as the input vector for the compute in memory matrix with the V* matrix for layer at step 2511, where this can again be performed in the same array as steps 2503 and 2507. The multiplication of step 2511 then generates the output for the layer at step 2513.

The flow of FIG. 25 corresponds to the optimized, or OPT, mode for the LRA-based inferencing as illustrated in FIGS. 19A and 19B, where the matrix has the rank $R^{OPT}$, such determined in the flow of FIG. 15. FIG. 26 is a flow for the HPEE mode operation, as illustrated in FIGS. 20A/B, where the matrix has the rank $R^{REQ}$ as can be determined as described with respect to FIG. 22 or FIG. 23. The flow of FIG. 26 largely corresponds to the flow of FIG. 25, but now includes a step to read out the $R^{REQ}$ value form the LRMR register and the inferences now use the set to matrices ($U_{LR}$, $\Sigma_{LR}$, $V^*_{LR}$), where these are reduced from the full (U, $\Sigma$, V*) matrices based on $R^{REQ}$ value.

More specifically, at step 2601 the input vector for the layer is received and the corresponding $R^{REQ}$ values is received at 2603, such as by reading the value out of the LRMR register that can be among the registers 313 of FIG. 5 or 6A. Steps 2605 and 2607 can be performed as steps 2503 and 2505, except the input vector is now applied to the $U_{LR}$ matrix in step 2605 as opposed to the full U. Similarly, steps 2609 and 2611 can correspond to steps 2507 and steps 2509, but using the reduced $\Sigma_{LR}$ matrix for layer; and steps 2613 and 2615 can correspond to steps 2511 and 2513, but using the reduced $V^*_{LR}$ matrix to generate the output for the layer at step 2615.

FIG. 27 is a flowchart for one embodiment for compute in memory matrix multiplication. The flow of FIG. 27 can correspond the multiplications of FIGS. 24 (step 2403), 25 (steps 2503, 2507, and 2511), or 26 (steps 2605, 2609, and 2513). At step 2701, the weights have been preloaded in the memory array, where these can be the conventional weights (FIGS. 18 and 24) or the corresponding sets of LRA-based set of weights (FIGS. 19A/B and FIGS. 20A/20B and 25/26) and the input matrix is received. The input matrix can be provided a host's CPU for the first layer of a network; be provided by the previous layer in a pipelined execution; or provided by the output another matrix of the singular value decomposition for the layer.

At step 2703, the bit lines corresponding to the weight matrix are activated, where this can be done sequentially as the flow loops back from step 2711. The bit lines activate correspond to the matrix involved in the current compute in memory operation. For example, referring back to FIGS. 18-20, the bit lines activated by the bit line decoder 1821/1921 would include BL1-BLN for the conventional weight matrix of FIG. 18, BL1-BLR$^{OPT}$ for the matrix U 1953 of FIG. 19A/B, and BL1-BLR$^{REQ}$ for the matrix U' 2053 of FIG. 20A or 20B. At step 2705, the word lines corresponding to the matrix are biased, such as by the DACs 1811-1817/1911-1917, to voltages levels corresponding to the input values received at step 2701. In one set of embodiments this can be the multiple or all of the word lines corresponding the matrix. For example, referring back to FIGS. 18-20, the word lines activated by the word line decoder 1801/1901 and DACs 1811-1817/1911-1917 can include WL1-WLM for the conventional weight matrix of FIG. 18, WL1-WL-R$^{OPT}$ for the matrix V* 1955 of FIG. 19A/B, and WL1-WLR$^{REQ}$ for the matrix V*$_{LR}$ 2055 of FIG. 20A or 20B.

At step 2707 the input/output circuits of the array, such ADC 1823/1923 and sense amplifiers and elements of the read/write circuits 328, read out the result of the in-array multiplication, achieving one element of the output matrix at step 2709. Step 2711 determines whether all of the bit lines corresponding to the weight matrix have been read and, if not, the flow loops back to step 2703. If the last bit line has been read, the flow moves on to step 2713, with all of the elements of the output matrix being achieved. The output matrix can then serve and the input for the next layer of the matrix at step 2715, where it can serve as the input for the next layer at a corresponding step 2701. For example, in the conventional embodiment of FIG. 18, though output from one layer will go the next layer. In the embodiments of FIGS. 19A and 20A, the outputs from the U/$U_{LR}$ matrix will serve as inputs for the $\Sigma/\Sigma_{LR}$ matrix of the same layer, the outputs from the $\Sigma/\Sigma_{LR}$ matrix will serve as inputs for the V*/V*$_{LR}$ matrix of the same layer, and the outputs from the V*/V$_{LR}$* matrix will serve as input for the U/$U_{LR}$ matrix of the subsequent layer. In the embodiments of FIGS. 19B and 20B, the intermediated outputs from the U'/U'$_{LR}$ matrix will serve as the input for the V*/V$_{LR}$* matrix, as the matrix has been rolled into the U'/U'$_{LR}$ matrix. The process can then repeat until all the initial input has been propagated through all of the layers to achieve the final output of the DNN.

According to a first set of aspects, a non-volatile memory device includes one or more arrays of non-volatile memory cells configured to store, for each of one or more layers of a neural network, a plurality of matrices of a singular value decomposition of weight values of the layer; and one or more control circuits connected to the one or more memory arrays. The one or more control circuits are configured, for each of the one or more layers of the neural network, to: apply an input for the layer as input for a first matrix multiplication with a first matrix of the singular value decomposition of the weight values of the layer to generate a first intermediate output for the layer; and apply the first intermediate output as input for a second matrix multiplication with a second matrix of the singular value decomposition of the weight values of the layer to generate a second intermediate output for the layer.

In additional aspects, a method includes receiving an input for a first layer of a neural network at a non-volatile memory device storing a set of weights for the first layer in one or more arrays as a plurality matrices of a singular value decomposition of the set of weights for the first layer and performing a first in-memory inference operation. The first in-memory inference operation includes: applying the input for the first layer to a first matrix of the singular value decomposition of the set of weights for the first layer to generate a first intermediate output for the first layer; determining an intermediate input for the first layer from the first intermediate output for the first layer; and applying the intermediate input for the first layer to a second matrix of the singular value decomposition of the set of weights for the first layer to generate a first output for the first layer.

In another set of aspects, an apparatus includes a control circuit configured to connect to an array of memory cells. The control circuit is configured to: receive an input vector for a layer of a neural network; apply the input vector to a first matrix of a singular value decomposition of a set of weights for the layer of the neural network to generate an intermediate output for the layer by an in memory multiplication; generate an intermediate input from the intermediate output; and apply the intermediate input for the layer to a second matrix of the singular value decomposition to generate an output vector for the layer of the neural network in response to the input vector.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
   a bonded die pair, comprising:
      a memory die including one or more arrays of non-volatile memory cells configured to store, for each of one or more layers of a neural network, a plurality of matrices of a singular value decomposition of weight values of the layer; and
   a control die, formed separately from and bonded to the memory die and including one or more control circuits connected to the one or more memory arrays and configured, for each of the one or more layers of the neural network, to:
      apply an input for the layer as input for a first matrix multiplication with a first matrix of the singular value decomposition of the weight values of the layer to generate a first intermediate output for the layer; and
      apply the first intermediate output as input for a second matrix multiplication with a second matrix of the singular value decomposition of the weight values of the layer to generate a second intermediate output for the layer.

2. The non-volatile memory device of claim 1, wherein: each of the one or more arrays is formed of storage class memory cells.

3. The non-volatile memory device of claim 1, wherein, for each of the one or more layers, the plurality of matrices of the singular value decomposition of the weight values of the layer is three matrices, and wherein the one or more control circuits are further configured to:
   apply the second intermediate output as input for a third matrix multiplication with a third matrix of the singular value decomposition of the weight values of the layer to generate an output for the layer.

4. The non-volatile memory device of claim 3, wherein the one or more control circuits are further configured to:
   for each of the one or more layers, provide the output for the layer as input to a subsequent layer of the neural network having a plurality of matrices of a singular value decomposition of the weight values of the subsequent layer stored in the one or more arrays.

5. The non-volatile memory device of claim 1, wherein, for each of one or more layers of a neural network, the plurality of matrices of a singular value decomposition of the weight values of the layer are stored in a single array of the non-volatile memory device.

6. The non-volatile memory device of claim 1, wherein the plurality of matrices of the singular value decomposition is a low rank approximation.

7. A non-volatile memory device, comprising:
   one or more arrays of non-volatile memory cells configured to store, for each of one or more layers of a neural network, a plurality of matrices of a singular value decomposition of weight values of the layer; and
   one or more control circuits connected to the one or more memory arrays and configured, for each of the one or more layers of the neural network, to:
      apply an input for the layer as input for a first matrix multiplication with a first matrix of the singular value decomposition of the weight values of the layer to generate a first intermediate output for the layer; and
      apply the first intermediate output as input for a second matrix multiplication with a second matrix of the singular value decomposition of the weight values of the layer to generate a second intermediate output for the layer,
   wherein the second matrix is a diagonal matrix of a first rank and the one or more control circuits are further configured to:
      operate in a first mode, wherein all of the second matrix is used to generate the second intermediate output; and
      operate in a second mode, wherein a portion of the second matrix of a second rank less than the first rank is used to generate the second intermediate output.

8. The non-volatile memory device of claim 7, further comprising:
   a register configured to store a value of the second rank.

9. The non-volatile memory device of claim 7, wherein: each of the one or more arrays is formed of storage class memory cells.

10. The non-volatile memory device of claim 7, wherein, for each of the one or more layers, the plurality of matrices of the singular value decomposition of the weight values of the layer is three matrices, and wherein the one or more control circuits are further configured to:
    apply the second intermediate output as input for a third matrix multiplication with a third matrix of the singular value decomposition of the weight values of the layer to generate an output for the layer.

11. The non-volatile memory device of claim 10, wherein the one or more control circuits are further configured to:
    for each of the one or more layers, provide the output for the layer as input to a subsequent layer of the neural network having a plurality of matrices of a singular value decomposition of the weight values of the subsequent layer stored in the one or more arrays.

12. The non-volatile memory device claim 7, wherein, for each of one or more layers of a neural network, the plurality of matrices of a singular value decomposition of the weight values of the layer are stored in a single array of the non-volatile memory device.

13. The non-volatile memory device claim 7, wherein the plurality of matrices of the singular value decomposition is a low rank approximation.

14. The non-volatile memory device claim 7, wherein the non-volatile memory device comprises:
    a bonded die pair, comprising:
       a memory die including the one or more arrays of non-volatile memory cells; and a control die, formed separately from and bonded to the memory die and including the one or more control circuits.

15. A method, comprising: receiving an input for a first layer of a neural network at a non-volatile memory device storing a set of weights for the first layer in one or more arrays as a plurality matrices of a singular value decomposition of the set of weights for the first layer; and performing a first in-memory inference operation comprising: applying the input for the first layer to a first matrix of the singular value decomposition of the set of weights for the first layer to generate a first intermediate output for the first layer; determining an intermediate input for the first layer from the first intermediate output for the first layer; and applying the intermediate input for the first layer to a second matrix of the singular value decomposition of the set of weights for the first layer to generate a first output for the first layer, wherein the determining the intermediate input for the first layer from the first intermediate output for the first layer includes: applying the first intermediate output for the first layer to a third matrix of the singular value decomposition of the set of weights for the first layer to generate a second intermediate output for the first layer; and using the second intermediate output for the first layer as the first intermediate output for the first layer.

16. The method of claim 15, wherein the determining the intermediate input for the first layer from the first intermediate output for the first layer includes:
using the first intermediate output for the first layer as the first intermediate output for the first layer.

17. The method of claim 15, wherein the first matrix of the singular value decomposition of the set of weights for the first layer is a matrix of a first size, the method further comprising:
determining an accuracy value for the first in-memory inference operation;
performing a second in-memory inference operation to generate a second output for the first layer of the neural network using a reduced size portion of the first matrix of the singular value decomposition of the set of weights for the first layer;
determining an accuracy value for the second in-memory inference operation; and
performing a comparison of the accuracy value for the second in-memory inference operation to the accuracy value for the first in-memory inference operation.

18. The method of claim 17, further comprising:
based upon a result of the comparison, determining a second size for the first matrix, the second size being smaller than the first size; and
subsequently performing a second in-memory inference operation to generate a second output for the first layer of the neural network using portions of the plurality of matrices of the singular value decomposition of the set of weights for the first layer corresponding to the second size.

19. The method of claim 15, wherein the non-volatile memory device further stores a set of weights for a second layer of the neural network in one or more arrays as a plurality of matrices of a singular value decomposition of the set of weights for the second layer, the first in-memory inference operation further comprising:
applying the first output for the first layer to a first matrix of the singular value decomposition of the set of weights for the second layer to generate a first intermediate output for the second layer;
applying the first intermediate output for the second layer to the second matrix of the singular value decomposition of the set of weights for the second layer to generate a second intermediate output for the second layer; and
determining an intermediate input for the second layer from the first intermediate output for the second layer; and
applying the intermediate input for the second layer to a second matrix of the singular value decomposition of the set of weights for the second layer to generate a first output for the second layer.

20. The method of claim 19, wherein the first matrix of the singular value decomposition of the set of weights for the first layer is of a first size and the first matrix of the singular value decomposition of the set of weights for the second layer is a of a second size, the method further comprising:
determining an accuracy value for the first in-memory inference operation;
performing a second in-memory inference operation to generate a second output for the first layer of the neural network using a reduced rank portion of the second matrix of the singular value decomposition of the set of weights for one or both of the first layer and the second layer;
determining an accuracy value for the second in-memory inference operation;
performing a comparison of the accuracy value for the second in-memory inference operation to the accuracy value for the first in-memory inference operation; and
based upon a result of the comparison, determining a reduced size for one or both of the first size and the second size.

* * * * *